(12) United States Patent
Sawada et al.

(10) Patent No.: US 6,431,714 B1
(45) Date of Patent: Aug. 13, 2002

(54) MICRO-MIRROR APPARATUS AND PRODUCTION METHOD THEREFOR

(75) Inventors: Renshi Sawada; Eiji Higurashi, both of Atsugi; Tohru Maruno, Naka-gun, all of (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/972,683

(22) Filed: Oct. 5, 2001

(30) Foreign Application Priority Data

Oct. 10, 2000 (JP) .......................................... 2000-308975
Jun. 7, 2001 (JP) .......................................... 2001-172146

(51) Int. Cl.$^7$ ............................................... G02B 7/182
(52) U.S. Cl. ..................... 359/879; 359/880; 359/871; 359/872; 359/224
(58) Field of Search ................................. 359/879, 880, 359/871, 872, 220, 221, 223, 224, 225, 226, 196, 197, 198, 298, 838, 839, 847, 848, 850

(56) References Cited

U.S. PATENT DOCUMENTS

| | | | | | |
|---|---|---|---|---|---|
| 6,081,499 | A | * | 6/2000 | Berger et al. ................ | 369/112 |
| 6,176,587 | B1 | * | 1/2001 | Fredricks ..................... | 359/843 |
| 6,178,284 | B1 | * | 1/2001 | Bergmann et al. .......... | 385/140 |
| 6,292,600 | B1 | * | 9/2001 | Goldstein et al. ............ | 385/18 |
| 6,337,477 | B1 | * | 1/2002 | Shimada et al. ............ | 250/216 |
| 6,359,718 | B1 | * | 3/2002 | Lin et al. .................... | 359/224 |

* cited by examiner

*Primary Examiner*—Mohammad Sikder
(74) *Attorney, Agent, or Firm*—Darby & Darby

(57) ABSTRACT

The micro-mirror apparatus of the invention has; a mirror 33, a plurality of torsion springs 35, 36 for supporting the mirror 33 so as to be tiltable relative to an upper substrate 27, a lower substrate 21 arranged facing a lower face of the mirror 33, a convex portion 34 provided on an upper face of the lower substrate 21 and a plurality of lower electrodes 22, 23 formed on an outer face of the convex portion 34. For the torsion spring 36, an aspect ratio of height/width in a cross-section perpendicular to a longitudinal direction thereof is at least 1.8.

9 Claims, 26 Drawing Sheets

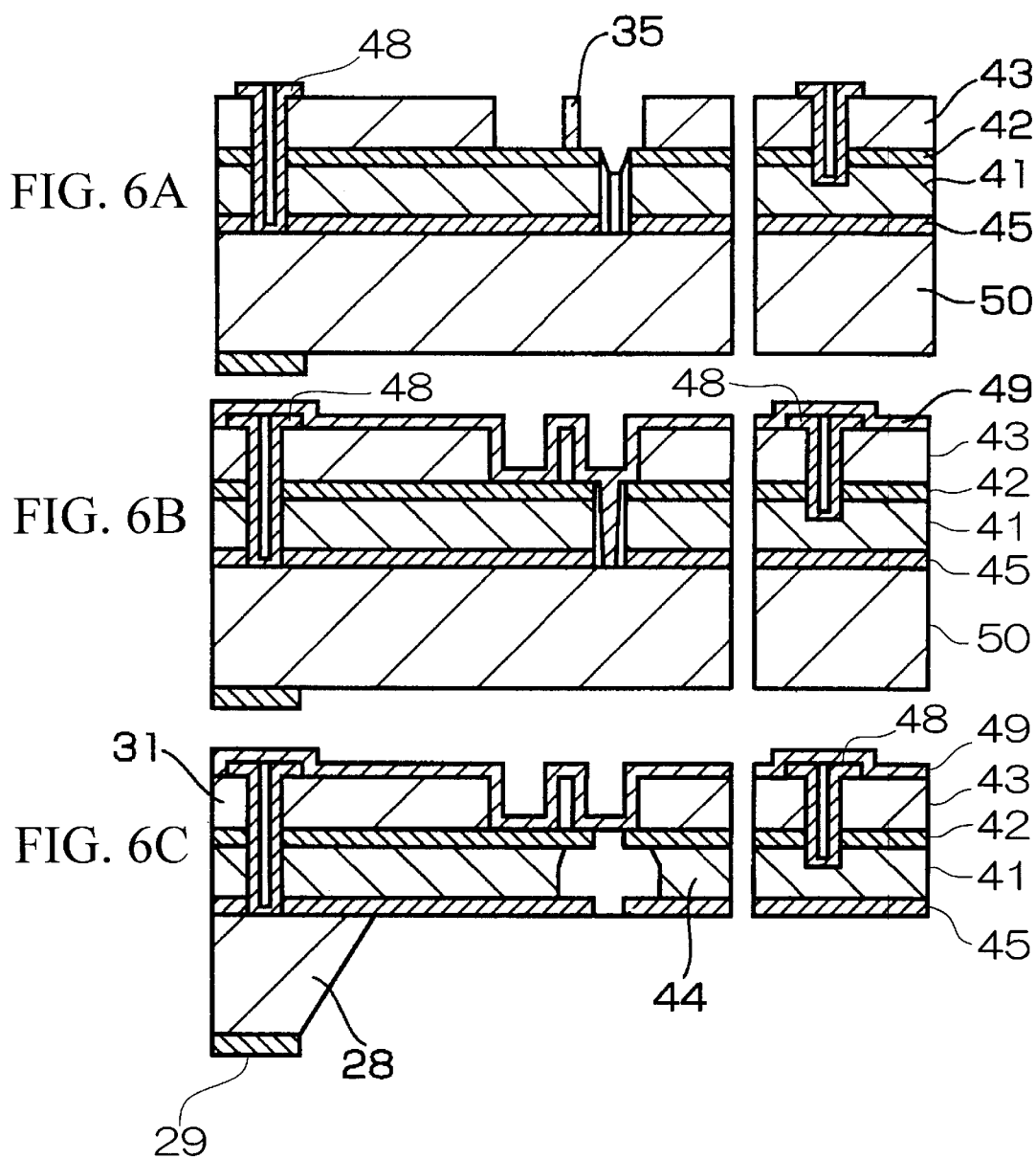

MICRO-MIRROR APPARATUS AND PRODUCTION METHOD THEREFOR

BACKGROUND OF THE INVENTION

1. Field of the Invention

The present invention relates to a micro-mirror apparatus which can be used in communication optical switch elements, measuring instruments, displays, scanners and the like, and a production method therefor.

2. Description of the Related Art

FIG. 34 is an outline perspective diagram showing a conventional micro-mirror apparatus.

In this micro-mirror apparatus, as shown in the figure, a turnable support 2 is provided on a substrate 1, and a base 3 is turnably provided on the support 2 via a hinge 7. A frame 4 is provided on the base 3 via a torsion spring (not shown in the figure), a mirror 5 is provided on the frame 4 via a torsion spring (not shown in the figure), and a plurality of lower electrodes 6 are provided on a portion of the base 1 facing the mirror 5. By applying a voltage to these lower electrodes 6, the mirror is attracted by electrostatic force so that the mirror can be tilted in optional directions.

The micro-mirror apparatus shown in FIG. 34 is made by a surface micro-machining technique. That is, growing of a polysilicon layer and forming of a silicon oxide layer ($SiO_2$) are performed while patterning respective layers, to thereby alternately deposit a polysilicon layer and a silicon oxide layer. Then, by finally immersing for example in a buffer hydrofluoric acid and dissolving the silicon oxide layer to remove the silicon oxide layer, a moveable part is formed. Since this silicon oxide layer, for example the silicon oxide layer 11 shown in FIG. 35, exists for forming a moveable part or a gap it is referred to as a sacrificial layer.

In the micro-mirror apparatus shown in FIG. 34, after forming the patterned layer comprising the silicon oxide layer and the polysilicon, the silicon oxide layer is removed with the buffer hydrofluoric acid to form the support 2, the base 3, the frame 4, and the mirror 5.

When the micro-mirror apparatus is made by the above method, if a multiplicity of mirror patterns are formed, there is the advantage that by merely removing the silicon oxide layer 11 being the sacrificial layer, a multiplicity of mirrors 5 are formed.

However, in the above micro-mirror apparatus, electrodes for the mirror 5 and the lower electrodes 6 are arranged in parallel, and the gap between electrodes is large. Since the electrostatic force applied to the mirror 5 is inversely proportional to the square of the inter-electrode gap, then a high voltage is necessary to cause a significant tilt to the mirror.

Furthermore, in this micro-mirror apparatus, since the mirror 5 is formed from polysilicon, internal strain due to grain growth conditions remains, and this causes distortion of the mirror 5. Due to this distortion, when collimated light is incident thereon, this is reflected with the beam having a beam profile of a warped shape. Consequently, in the case where this micro-mirror apparatus is used as an optical switch for switching for example from an input optical fiber to an output optical fiber, there is a large loss when the collimated beam output from the input fiber is reflected and then input to the output fiber.

Therefore, in order to reduce this loss due to distortion of the mirror 5, a surface distribution of the voltage between the lower electrodes 6 and the electrodes of the mirror 5 which can correct this distortion is previously stored in the memory of a computer, and based on this, the distribution of electrostatic force applied to the mirror 5 is controlled, to thereby correct the distortion of the mirror 5. However, such correction is extremely troublesome.

Furthermore, the torsion spring for applying a restoring force to the mirror is formed from polysilicon, and since polysilicon has many grain boundaries, when a repetitive force acts, this becomes a cause of fatigue failure at the grain boundaries. Consequently, when a repetitive force is applied, fatigue advances rapidly so that life becomes a problem.

Furthermore, since the support 2 which supports the mirror 5 is also made from polysilicon, there is also a problem in that the support 2 distorts due to fluctuations in the electrostatic force applied to the mirror 5.

Moreover, since the printed wiring for energizing each of the lower electrodes 6 is formed on the surface side of the base 1, then in a case where the mirror 5 is configured in multiple aligned arrays, the necessary wiring pattern width becomes fine. Furthermore, since it is necessary for the wiring to avoid the support 2, there is a problem in that the wiring degree of freedom is reduced.

SUMMARY OF THE INVENTION

It is an object of the present invention to provide a micro-mirror apparatus where the mirror can be greatly tilted with a low voltage.

To achieve this object, the micro-mirror apparatus of the present invention has; a mirror, a plurality of torsion springs which supports the mirror so as to be tiltable relative to an upper substrate, a lower substrate arranged facing a lower face of the mirror, a convex portion provided on an upper face of the lower substrate and facing a central portion of the mirror, and a plurality of lower electrodes formed on an outer face of the convex portion.

According to this micro-mirror apparatus, by forming the convex portion, at least one part of the mirror and the lower electrode can be made close, so that the voltage necessary for tilting the mirror can be reduced.

For the torsion spring, an aspect ratio of height/width in a cross-section perpendicular to a longitudinal direction thereof is at least 1.8. In this case it becomes easier to tilt the mirror while maintaining the support strength due to the torsion spring, and hence the voltage necessary for tilting the mirror can be reduced.

A concavity may be formed in an upper face of the lower substrate at a position facing an outer peripheral edge of the mirror and surrounding the convex portion. In this case the mirror can be tilted until the outer peripheral edge of the mirror enters the concavity. Hence the tilt range of the mirror can be increased, and since the mirror is unlikely to contact with the lower substrate, damage to the mirror can be prevented.

A supporting point protuberance made from an insulating material may be formed facing a center of the mirror. In this case, excessive downward displacement of the mirror can be prevented by the supporting point protuberance, so that there is no shorting between the mirror electrodes and the lower electrodes. Hence, damage to the mirror electrodes and the lower electrodes can be prevented.

The torsion spring may have a serpentine form, and a position restricting portion which restricts a displacement range of the torsion spring may be provided on the upper substrate. In this case, excessive displacement of the torsion spring and the mirror can be prevented by the position restricting portion, and damage to the torsion spring can be prevented.

The mirror, the torsion spring, and the upper substrate may be integrally formed from a silicon monocrystal, and this silicon monocrystal may be connected to a spacer formed on the lower substrate. In this case, the flatness of the mirror can be increased and the life of the torsion spring can be extended.

Wiring patterns may be formed on a lower face of the lower substrate, and each of these wiring patterns and the lower electrodes may be conducted through a through hole formed in the lower substrate. In this case, the degree of freedom for the wiring to the lower electrode is increased and not only can the wiring can be simplified, but also the wiring pattern width can be widened.

A production method for a micro-mirror apparatus of the present invention comprises the steps of:

sequentially forming on a support substrate, a first oxide layer, a first monocrystalline silicon layer, a second oxide layer and a second monocrystalline silicon layer;

forming a slot passing through the second monocrystalline silicon layer, the second oxide layer, and the first monocrystalline silicon layer;

forming a polysilicon layer inside the slot;

etching the second monocrystalline silicon layer to form a mirror and a torsion spring from the second monocrystalline silicon layer;

removing the polysilicon layer inside the slot;

etching a portion of the first monocrystalline silicon layer located beneath the torsion spring, through the slot; and removing the first oxide layer and the second oxide layer to make the torsion spring independent.

According to this production method, the mirror and the torsion spring can be easily formed integrally.

BRIEF DESCRIPTION OF THE DRAWINGS

FIG. 6A through FIG. 6C are explanatory diagrams of the production method for the micro-mirror apparatus shown in FIG. 4.

DETAILED DESCRIPTION OF THE INVENTION

Figure 1:
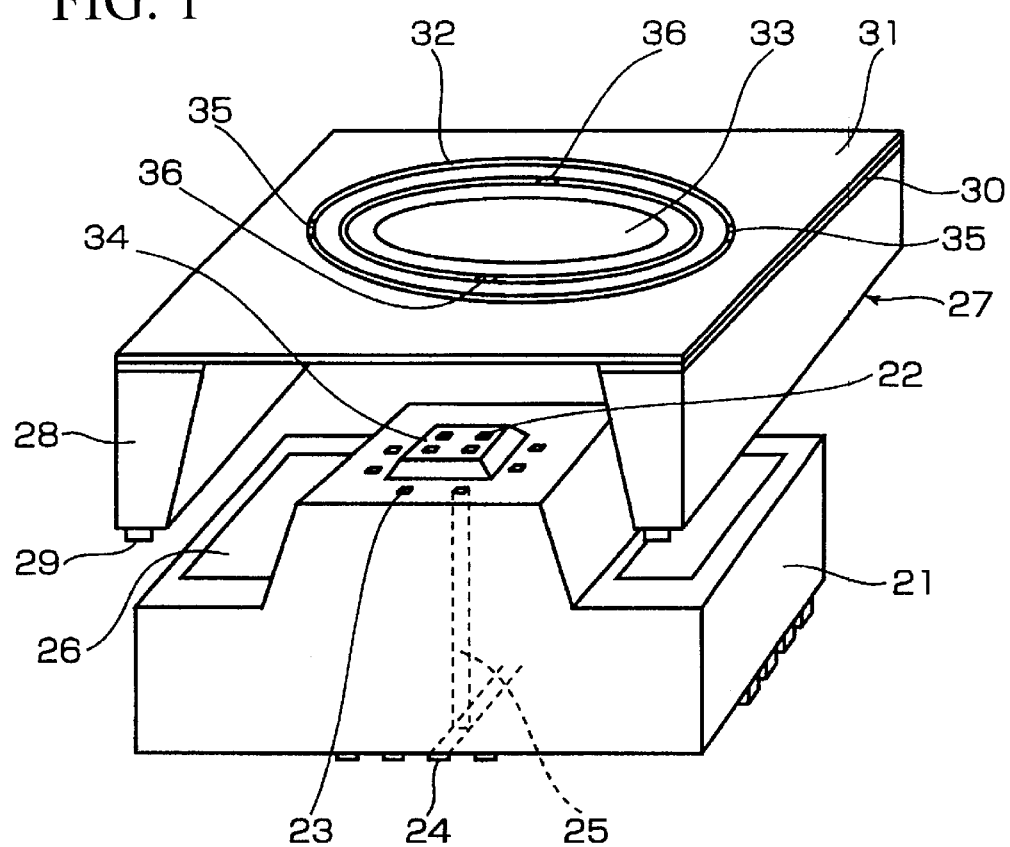
FIG. 1 is a disassembled perspective view showing a micro-mirror apparatus according to the present invention.
Figure 2:
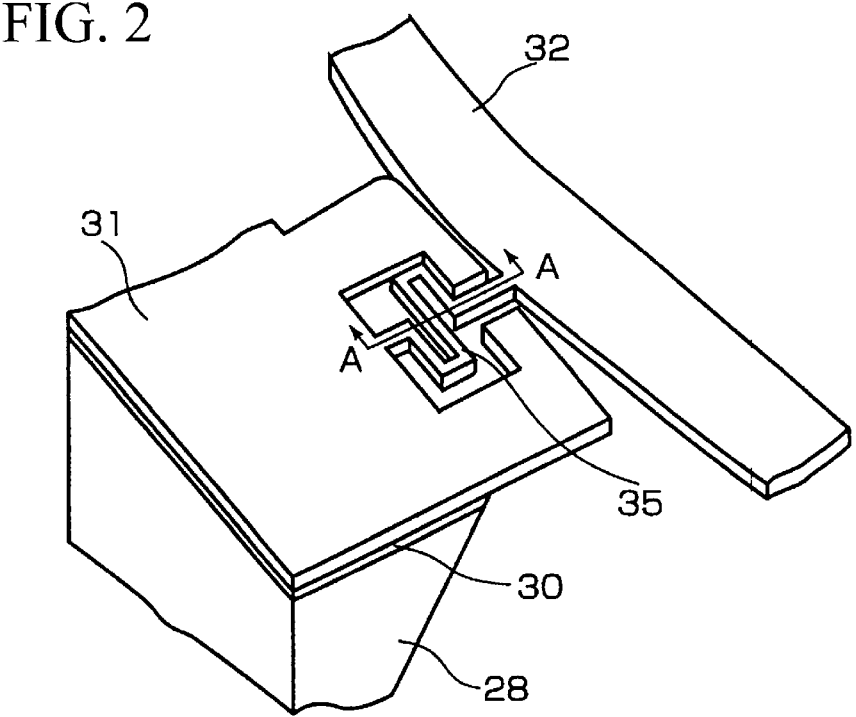
FIG. 2 is a perspective view showing a part of the micro-mirror apparatus shown in FIG. 1.
Figure 3:
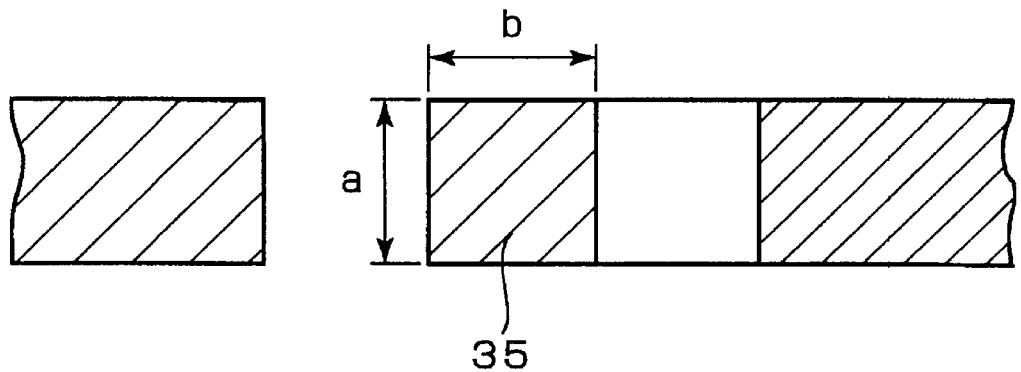
FIG. 3 is a section view on A—A of FIG. 2.

FIG. 1 is a perspective view showing a first embodiment of a micro-mirror apparatus according to the present invention, FIG. 2 is a perspective view showing the micro-mirror support structure, and FIG. 3 is a sectional view on A—A of FIG. 2. The present invention is not limited to only the following embodiments, and various modifications may be added within a scope which does not deviate from the gist of the present invention.

As shown in the figures, a protruding portion 34 of rectangular shape is provided on a central portion of a lower substrate (lower electrode substrate) 21 made from monocrystalline silicon having a crystal orientation (100), and respective lower electrodes 22 are provided on the top face of the protruding portion 34 near the four corners.

A plurality of spaced apart lower electrodes 23 are also provided around the protruding portion 34 (in this example eight). A patterned wiring 24 is provided on a lower face of the lower substrate 21, and the lower electrodes 23 and the wiring 24 are respectively electrically connected through through holes 25 piercing the lower substrate 21.

Solder portions 26 made of AuSn are provided on opposite sides on the upper face of the lower substrate 21. Furthermore, supports 28 made from monocrystalline silicon having a crystal orientation (100) are provided on a lower face of an upper substrate (mirror forming substrate) comprising an SOI (Silicon On Insulator) substrate. Upper widths of the supports 28 are for example 1 mm, while lower widths are 300 μm. Connection portions 29 comprising three layers of Ti/Pt/Au are provided on the lower portions of the supports 28, and the supports 28 are connected to the solder portions 26 of the lower substrate 21. As a result, the upper substrate 27 is bonded to the lower substrate 21.

A silicon oxide layer 30 is provided on an upper surface of the upper substrate 27, a base 31 comprising monocrystalline silicon is provided on the silicon oxide layer 30, an annular frame 32 is provided inside the base 31, and a mirror 33 is provided inside of the frame 32. A three layer Ti/Pt/Au layer is formed on the surface of the mirror 33 to make this conductive. The mirror 33 is supported by the support 28, and a space between the lower electrodes 22 and the mirror 33 is set for example to 20 μm while a space between the lower electrodes 23 and the mirror 33 is set for example to 40 μm.

The base 31 and the frame 32 are connected by torsion springs 35 at two places 180° apart, and the frame 32 and the mirror 33 are connected by torsion springs 36 at two places 180° apart. The torsion springs 35 and 36 are made the same shape. A line through the torsion spring 35 pair is orthogonal to a line through the torsion spring 36 pair. The base 31, the frame 32, the mirror 33 and the torsion springs 35 and 36 are integrally formed from monocrystalline silicon.

An aspect ration a/b of a cross-section of the torsion bars 35 and 36 where "a" is the height and "b" is width becomes an important parameter. Preferably the aspect ratio a/b is at least 1.8, more preferably 2.5 to 8, and most preferably about 3. If the aspect ratio a/b is at least 1.8, as well as the torsion springs 35 and 36 being easier to twist, the torsion springs 35 and 36 are less susceptible to deflection due to the weight of the mirror and the electrostatic force F. Therefore, attitude control of the mirror 36 is more accurately performed. This effect is explained as follows.

The torsion springs 35 not only function as springs for applying a twisting (torsion) restoring force but also function as a support which supports the weight of the mirror 33 portion. Therefore, a bending stress is applied to the torsion springs 35 by the weight of the mirror 33 and the electrostatic force F for driving the mirror 33, and although the mirror 33 may be firmly supported by the supports 28, this becomes a source causing deflection of the mirror 33. If the cross-section height of the torsion spring 35 is "a", the width "b", a constant is β, and the shearing modulus of the monocrystalline silicon is G, a relational expression for twist angle θ and torsion T of the torsion spring 35 is expressed by the following equation:

$$\theta = T/\beta ab^3 G$$

Furthermore, if α is a constant, E is the longitudinal section elastic modulus of monocrystalline silicon, and I is the second moment of area of the torsion spring 35, a relational expression for bending deflection amount δ and the electrostatic force F is expressed by the following equation:

$$\delta = F\alpha/EI$$

The second moment of area I is expressed by the following equation:

$$I = ba^3/12$$

Consequently, if a constant is A, the ratio δ/θ for the bending deflection δ and the twist angle θ is expressed by the following equation:

$$\delta\theta = A\beta(b/a)^2$$

Therefore, by making the height "a" much greater than the width "b", twisting becomes relatively easy, and deflection due to the weight of the mirror and the electrostatic force F becomes small.

In this micro-mirror apparatus, by making the upper substrate 27 negative, and applying a positive electric field to the lower electrodes 22 and 23, and generating an asymmetric potential difference between the lower electrodes 22 and 23, the mirror can be tilted in optional directions. For example, if a 60 V voltage is applied to all the lower electrodes 22 and 23 on one side, the mirror can be tilted approximately 10°.

In such a micro-mirror apparatus, the electrostatic force applied to the mirror is inversely proportional to the square of the inter-electrode gap. However since the protruding portion 34 is formed on the upper face of the lower substrate 21 facing the center portion of the mirror 33, and the lower electrodes 22 are formed on the upper face of the protruding portion 34, the distance between the mirror 33 and the lower electrodes 22 can be made small without narrowing the turning range of the mirror 33. Consequently, the mirror 33 can be greatly tilted with a low voltage.

Furthermore, in this embodiment, since the mirror 33 is formed from hard monocrystalline silicon rather than polysilicon, there is no residual distortion inside the mirror 33 and hence deformation due to internal strain is minimal. Consequently, when a collimated beam is shone, a warped shape beam profile does not occur. Moreover, in the case where this micro-mirror apparatus is used as an optical switch for switching from an input optical fiber to an output optical fiber, loss when the collimated beam output from the input optical fiber is reflected and then input to the output fiber can be reduced. Consequently, there is no longer the need to control the distribution of electrostatic force applied to the mirror 33 to compensate for distortion of the mirror 33.

Furthermore, in this embodiment, since the torsion springs 35 and 36 for applying a restoring force to the mirror 33 are formed from monocrystalline silicon, fatigue from the repetitive force is less likely to occur, and life is thus extended.

In addition, since an SOI substrate is used for the upper substrate 27, the micro-mirror apparatus can be easily produced.

Moreover, since the support 28 which supports the mirror 33 is also made from hard monocrystalline silicon, distortion of the support 28 due to fluctuations in the electrostatic force applied to the mirror 33 is obviated, so that attitude control of the mirror is accurately performed.

In addition, since the upper substrate 27 on which the mirror 33 is provided is made separate from the lower substrate 21 on which the lower electrodes 22 and 23 are provided, the occurrence of mirror sticking at the time of manufacture is obviated.

Furthermore, since the lower electrodes 23 and the wiring 24 are connected via the through holes 25, it is not necessary to wire to avoid the lower electrodes 22 and 23, and the support 28. Therefore the pattern width of the wiring 24 for driving the mirror 33 can be made wider, and the wiring degree of freedom and the wiring density can be increased.

A production method for the micro-mirror apparatus shown in FIG. 1 through FIG. 3 will now be described. At first, oxygen irons are implanted into the monocrystalline silicon substrate having a crystal orientation (100), to form the silicon oxide layer 30 of a uniform depth giving a SIMOX substrate. Monocrystalline silicon is then grown on the active layer of the SIMOX substrate by epitaxy to form an SOI layer of approximately 10 μm thickness, thus preparing an SOI substrate.

Then, the SOI layer of the SOI substrate is doped with impurities to give an impurity concentration of $1 \times 10^{20}$, so that the resistance becomes several thousandths Ωcm. Next, a reflection coating comprising three layers of Ti/Pt/Au is formed by lift-off. The connection portions 29 comprising three layers of Ti/Pt/Au are then patterned on the rear face of the support substrate of the SOI substrate using a two face aligner to match with the mirror pattern on the front face thereof. Then the supports 28 are formed by back etching the support substrate.

Next, the SOI layer is etched using ICP (inductively-coupled plasma), to thereby integrally form the base 31, the frame 32, the mirror 33 and the torsion springs 35 and 36. Then, after forming a silicon oxide layer (passivation film) on the surface with PCVD (plasma CVD) to protect the surface, this is etched with an etchant of KOH. For the etching conditions and so forth, reference can be made to H. Seidel et al., Anisotropic Etching of Crystalline Silicon in Alkaline Solutions I., J. Electrochem. Soc., Vol. 137, No. 11 (1990) 3612–3626, and H. Seidel et al., Anisotropic Etching of Crystalline Silicon in Alkaline Solutions II., J. Electrochem. Soc., Vol. 137, No. 11 (1990) 3626.

After forming the protruding portion 34 by etching the monocrystalline silicon substrate having a crystal orientation (100) with KOH, forming the lower electrodes 22 and 23, and forming the three layer Ti/Pt/Au layer on the lowest portion of the step, the solder portion 26 is formed on the Ti/Pt/Au layer.

Next, the through holes 25 are formed corresponding to the lower electrodes 23, and the wiring 24 is formed on the rear surface side of the monocrystalline silicon substrate. Then, after aligning the position of the upper substrate 27 with the lower substrate 21, the connection portions 29 are pressed against the solder portions 26 and heated to 390° C., so that the solder of the solder portions 26 is melted, thereby bonding the lower substrate 21 to the upper substrate 27.

According to this production method for the micro-mirror apparatus, since the mirror 33 is formed from monocrystalline silicon, there is no deformation due to internal strain. Furthermore, since the torsion springs 35 and 36 are formed from monocrystalline silicon, life with respect to repetitive forces is extended.

Figure 4:
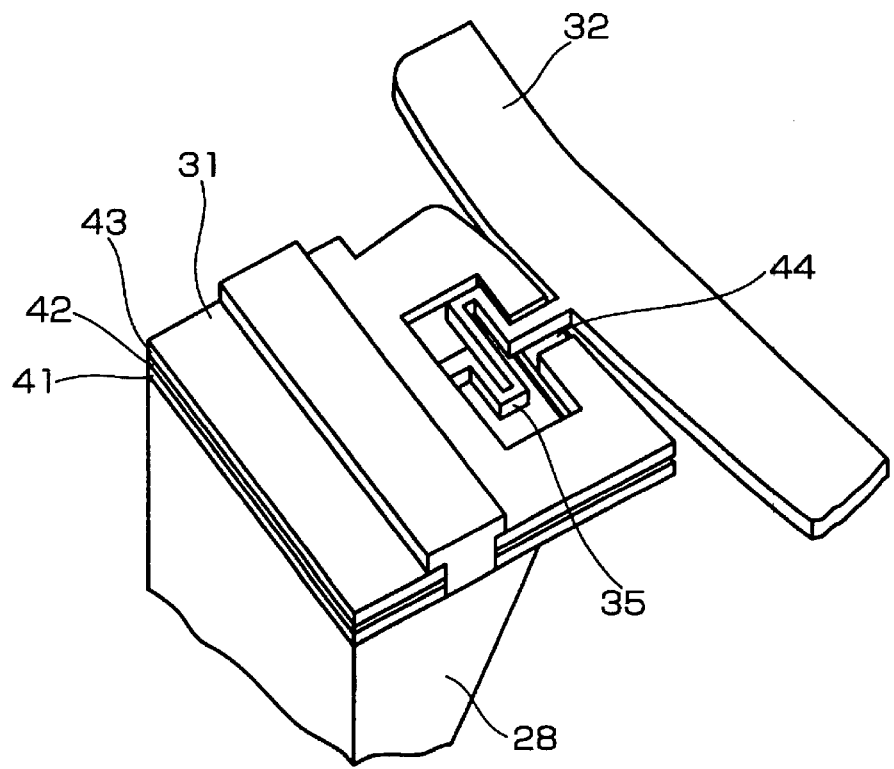
FIG. 4 is perspective view showing a part of another micro-mirror apparatus according to present invention.

FIG. 4 is a perspective view showing a part of another micro-mirror apparatus according to the present invention. As shown in the figure, a lower silicon layer 41 comprising monocrystalline silicon is provided on a support 28, a silicon oxide layer 42 is provided on the lower silicon layer 41 and an upper silicon layer 43 comprising monocrystalline silicon is provided on the silicon oxide layer 42. A base 31 is thus constructed by the lower silicon layer 41, the silicon oxide layer 42 and the upper silicon layer 43.

A torsion spring 35 and a frame 32 are formed by the upper silicon layer 43. Furthermore, a horizontal retention portion 44 for preventing the occurrence of deflection of the torsion spring 35 due to the weight of the mirror 33 portion and the electrostatic force F, is provided beneath the torsion spring 35. The retention portion 44 is constructed from a part of the lower silicon layer 41. If an excess load is applied to the mirror 33, the tip end of the torsion spring 35 contacts with the retention portion 44 so that further displacement is restricted.

In this micro-mirror apparatus, since the retention portion 44 is provided for preventing the occurrence of deflection in the torsion spring 35 due to the weight of the mirror 33 portion and the electrostatic force F, there is no longer the need to make the ratio a/b of the torsion spring 35 as large. Hence forming the torsion spring 35 is facilitated.

The production method for the micro-mirror apparatus of FIG. 4 will now be explained using FIG. 5A through FIG. 5D and FIG. 6A through FIG. 6C.

Figure 5A:
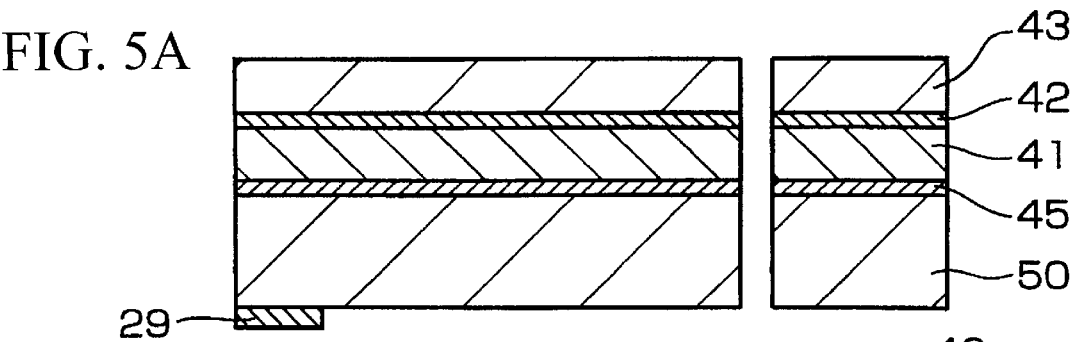
FIG. 5A through FIG. 5D are explanatory diagrams of a production method for the micro-mirror apparatus shown in FIG. 4.

As shown in FIG. 5A, on a support substrate 50 comprising monocrystalline silicon is formed in order; a silicon oxide layer 45, the lower silicon layer 41, the silicon oxide layer 42 and the upper silicon layer 43, and the connection portion 29 is formed on the lower portion of this five layer construction substrate.

Figure 5B:
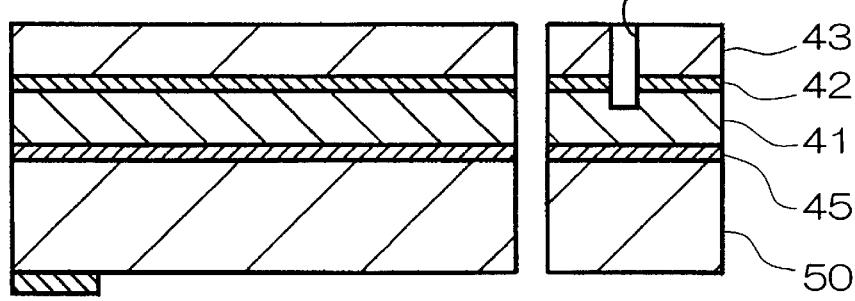
Figure 5C:
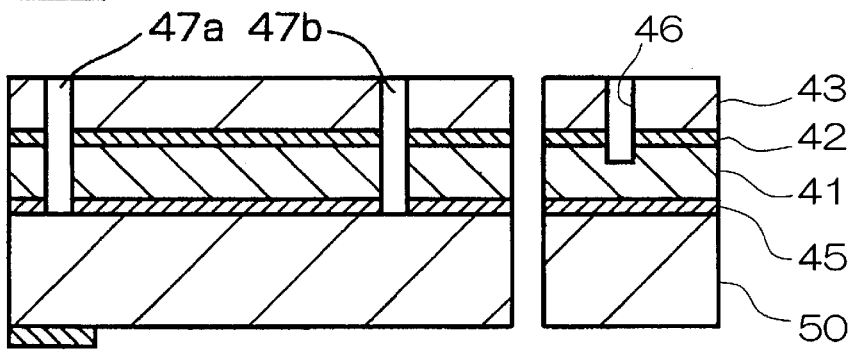

Next, as shown in FIG. 5B, a slot (hole) 46 which reaches to the lower silicon layer 41 is formed by etching. Then, as shown in FIG. 5C, slots (holes) 47a and 47b which penetrate to the silicon oxide layer 45 are formed by etching. In this case, at first the upper silicon layer 43 is etched using ICP with an $SF_6$ gas and the silicon oxide layer 42 is reactive etched with a CF based gas. After this, the lower silicon layer 41 is further etched using ICP with $SF_6$ gas, and the silicon oxide layer 45 is reactive etched with the CF based gas.

Figure 5D:
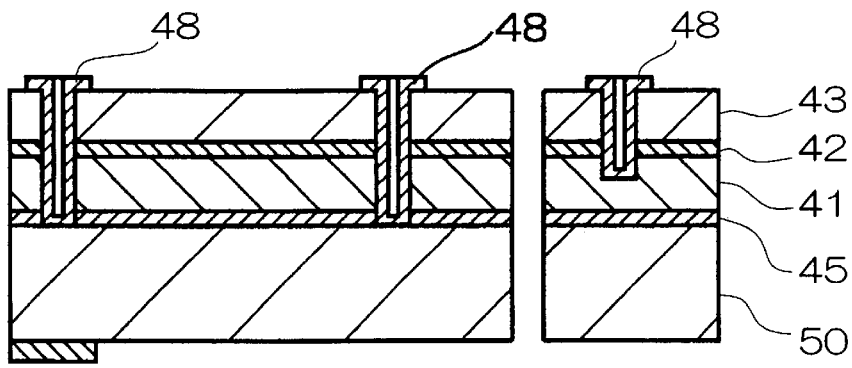

Next, as shown in FIG. 5D, polysilicon layers 48 are formed inside the slots 46, 47a and 47b.

Then, as shown in FIG. 6A, the torsion spring 35 is formed by etching the upper silicon layer 43. In this case, the silicon oxide layer 42 becomes an etching stopper.

Then, as shown in FIG. 6B, the three layer Ti/Pt/Au layer 49 is formed on the upper face of the upper silicon layer 43. Next, as shown in FIG. 6C, the support 28 is formed by back etching the support substrate 50. In this case, since the slot 47b passes through the silicon oxide layer 45, the slot 47b portion of the lower silicon layer 41 is also etched to thereby form the retention portion 44.

Next, the silicon oxide layers 42 and 45 are removed by soaking in a buffer hydrofluoric acid, to thereby separate the bottom of the torsion spring 35 from the retention portion 44.

In the production method for this micro-mirror apparatus, since the slot 47a passes through the silicon oxide layers 42 and 45, the silicon oxide layers 42 and 45 are removed by soaking in the buffer hydrofluoric acid. However at this time, in the base 31, removal of the silicon oxide layers 42 and 45 can be prevented. Therefore, in the base 31, the support substrate 50 (support 28), the lower silicon layer 41 and the upper silicon layer 43 are not separated.

Figure 7:
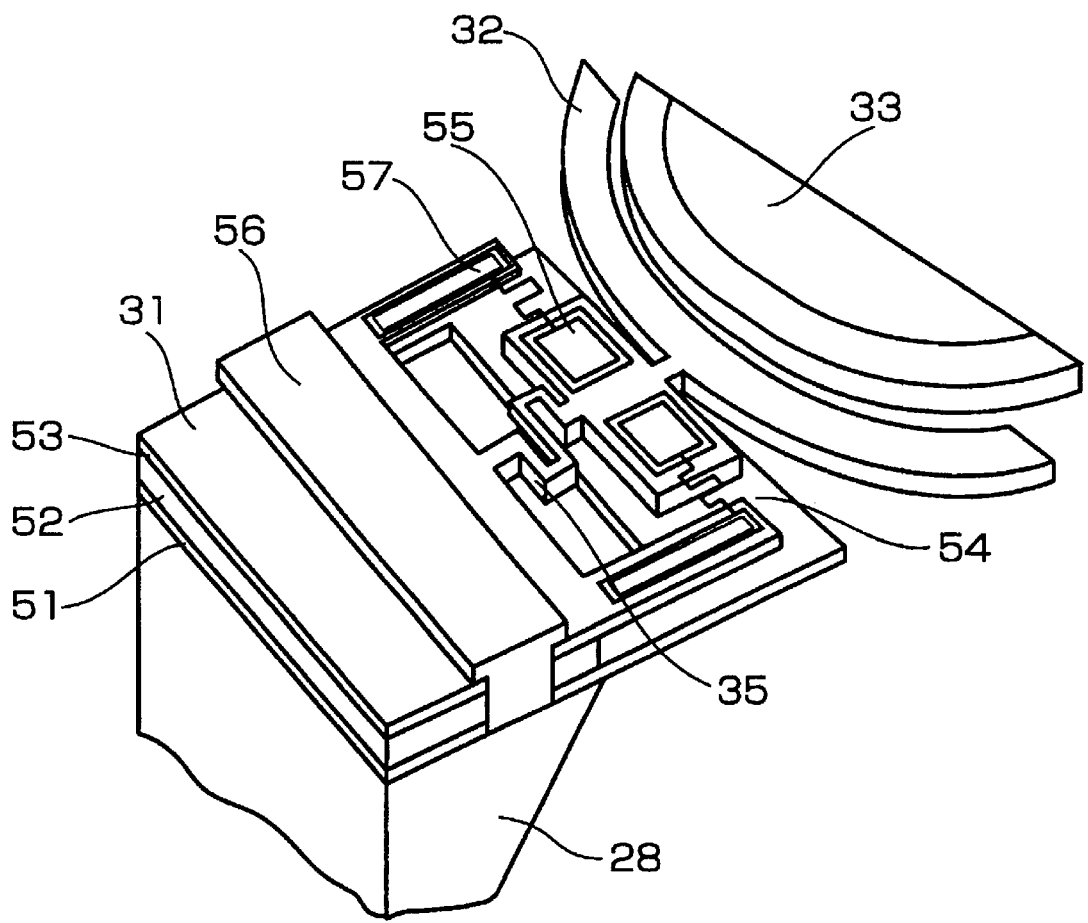
FIG. 7 perspective view showing a part of another micro-mirror apparatus according to the present invention
Figure 8:
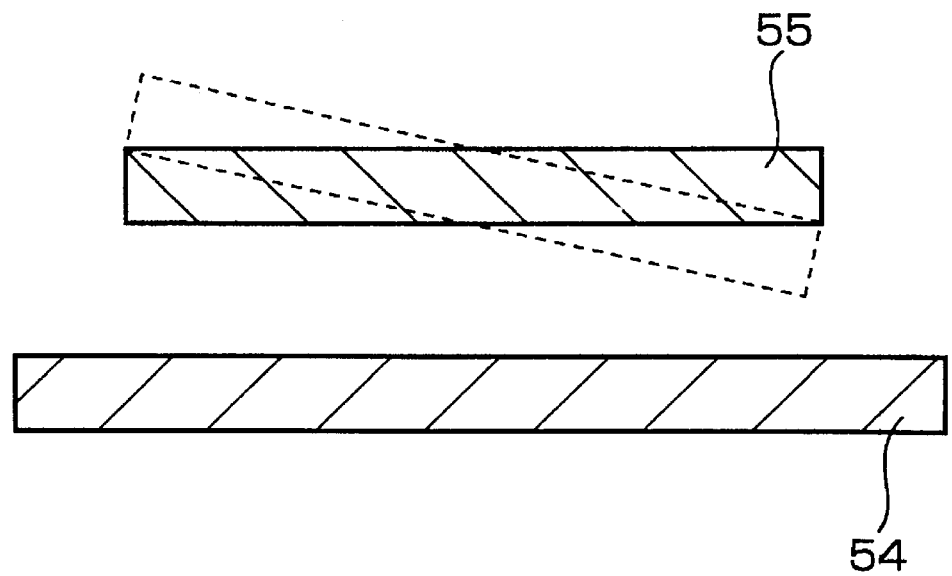
FIG. 8 is a cross-section showing a part of the micro-mirror apparatus shown in FIG. 7.

FIG. 7 is a perspective view showing a part of another micro-mirror apparatus according to the present invention, while FIG. 8 is a cross-section showing a part of the micro-mirror apparatus shown in FIG. 7. As shown in the figures, a lower silicon layer 51 comprising monocrystalline silicon is provided on a support 28, a central layer 52 comprising Si—B—O of a thickness of 10 μm is formed on the lower silicon layer 51, and an upper silicon layer 53 comprising monocrystalline silicon is formed on the central layer 52. A base 31 is thus constructed by the lower silicon layer 51, the central layer 52 and the upper silicon layer 53.

A lower electrode plate 54 are formed on a portion of the lower silicon layer 51, and upper electrodes 55 are provided between a torsion spring 35 and a frame 32 which are constituted by the upper silicon layer 53. The width of the upper electrodes 55, that is the dimension in a direction of a line through opposite ends of the torsion spring 35 is 40 μm and the length perpendicular to this is 55 μm.

An input electrode 56 connected to electrodes of the lower electrode plate 54 is formed on the base 31, and input electrodes 57 electrically connected to the upper electrode plate 55 are formed on portions on opposite sides of the torsion spring 35.

In this micro-mirror apparatus, when a negative voltage is applied to the input electrode 56, and a positive voltage is applied to the input electrodes 57, the upper electrode plates 55 can be tilted, and hence the mirror can be tilted.

With such a micro-mirror apparatus, since the thickness of the inner layer 52 is 10 μm, a gap between the lower electrode plate 54 and the upper electrode plate 55, that is an inter-electrode gap is 10 μm. Therefore, since electromotive force is proportional to the square of the inter-electrode gap, the mirror can be even further tilted. That is, while the area of the upper electrode plate 55 is only one sixth of the area of the micro-mirror apparatus, since the inter-electrode gap is one quarter of the inter-electrode gap of 40 μm for when there is no step provided for the electrodes of the lower electrode plate, the voltage applied to the input electrodes 56 and 57 can be made less than one half, that is 40 V, compared to when a step is not provided on the electrode portion of the lower substrate.

In this example, in the case where lower electrodes are also provided on the protruding portion 34 of the lower substrate 21 as shown in FIG. 1, and these are used together, the voltage applied to the input electrodes 56 and 57 can be made for example less than 25 V.

In the case of producing the micro-mirror apparatus shown in FIG. 7 and FIG. 8, Si—B—O is deposited on a SOI layer (lower silicon layer 51) of a SOI substrate, and a SIMOX substrate obtained by epitaxial crystal growth is superposed thereon and sintered to thereby bond the SOI substrate and the SIMOX substrate (refer to Japanese Unexamined Patent Application, First Publication 61-242033). Then, if the substrate is made by polishing and etching, the thickness of the intermediate layer 52 can be easily made 10 μm.

Figure 9:
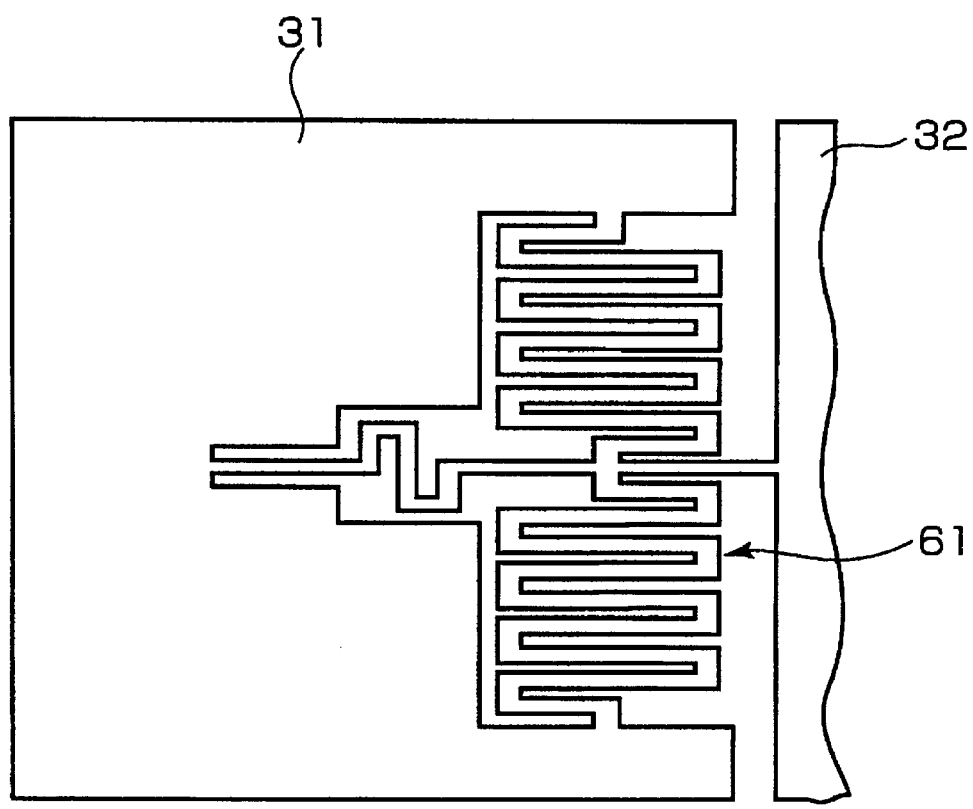
FIG. 9 shows a part of another micro-mirror apparatus according to the present invention.

FIG. 9 shows a part of another micro-mirror apparatus according to the present invention. As shown in the figure, a torsion spring 61 is provided between a base 31 and a frame 32, so that the frame 32 can be tilted about two orthogonally intersecting axes relative to the base 31.

Figure 10:
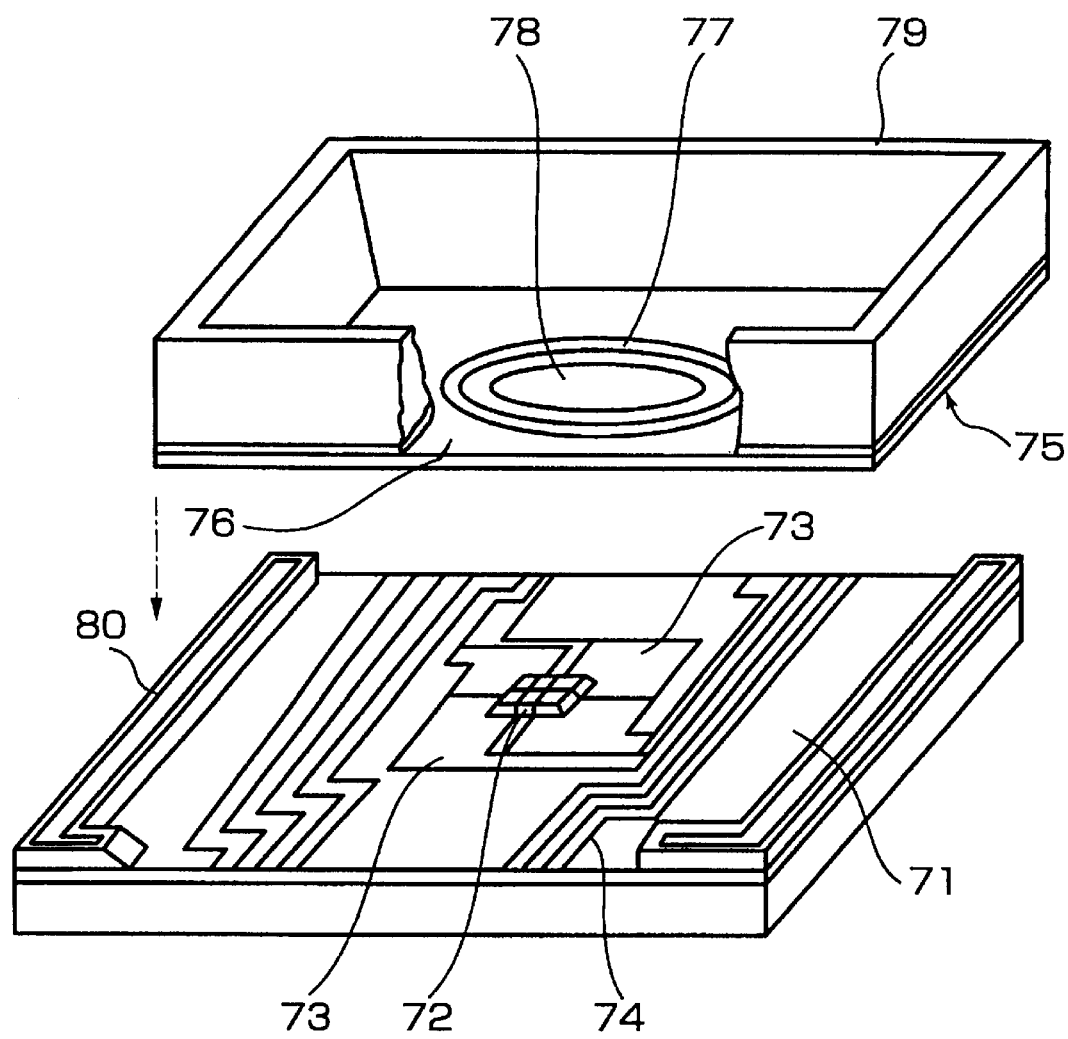
FIG. 10 is a disassembled perspective view showing another micro-mirror apparatus according to the present invention.

FIG. 10 is a disassembled perspective view showing another micro-mirror apparatus according to the present invention. As shown in the figure, a protruding portion 72 is provided on a lower substrate (lower electrode substrate) 71 comprising a monocrystalline silicon having a crystal orientation (100), lower electrodes 73 are provided on the protruding portion 72, and wiring 74 is provided on an upper surface of the lower substrate 71. The lower electrodes 73 are connected to the wiring 74, and a support 80 comprising monocrystalline silicon is provided on the upper surface of the lower substrate 71.

A frame portion 79 comprising monocrystalline silicon having a crystal orientation (100) is provided on an upper substrate (mirror forming substrate) 75, a base 76 comprising monocrystalline silicon is provided on the frame portion 79 and an annular frame 77 is provided inside the base 76. A mirror 78 is provided inside of the frame 77, a three layer Ti/Pt/Au layer is provided on the surface of the mirror 78, and a space between the lower electrodes 73 and the mirror 78 is 20 μm.

As with the micro-mirror apparatus shown in FIG. 1, the base 76 and the frame 77 are connected by torsion springs (not shown in the figure) at two places, and the frame 77 and the mirror 78 are connected by torsion springs (not shown in the figure) at two places. Furthermore, the upper substrate 75 is fixed to the support 80 with solder, so that the upper substrate 75 is bonded to the lower substrate 71.

In this micro-mirror apparatus, the frame portion 79 can be formed by back etching the support substrate of the SOI substrate. Moreover, the frame 77, the mirror 78 and the torsion spring can be integrally formed by etching the SOI layer of the SOI substrate.

Figure 11:
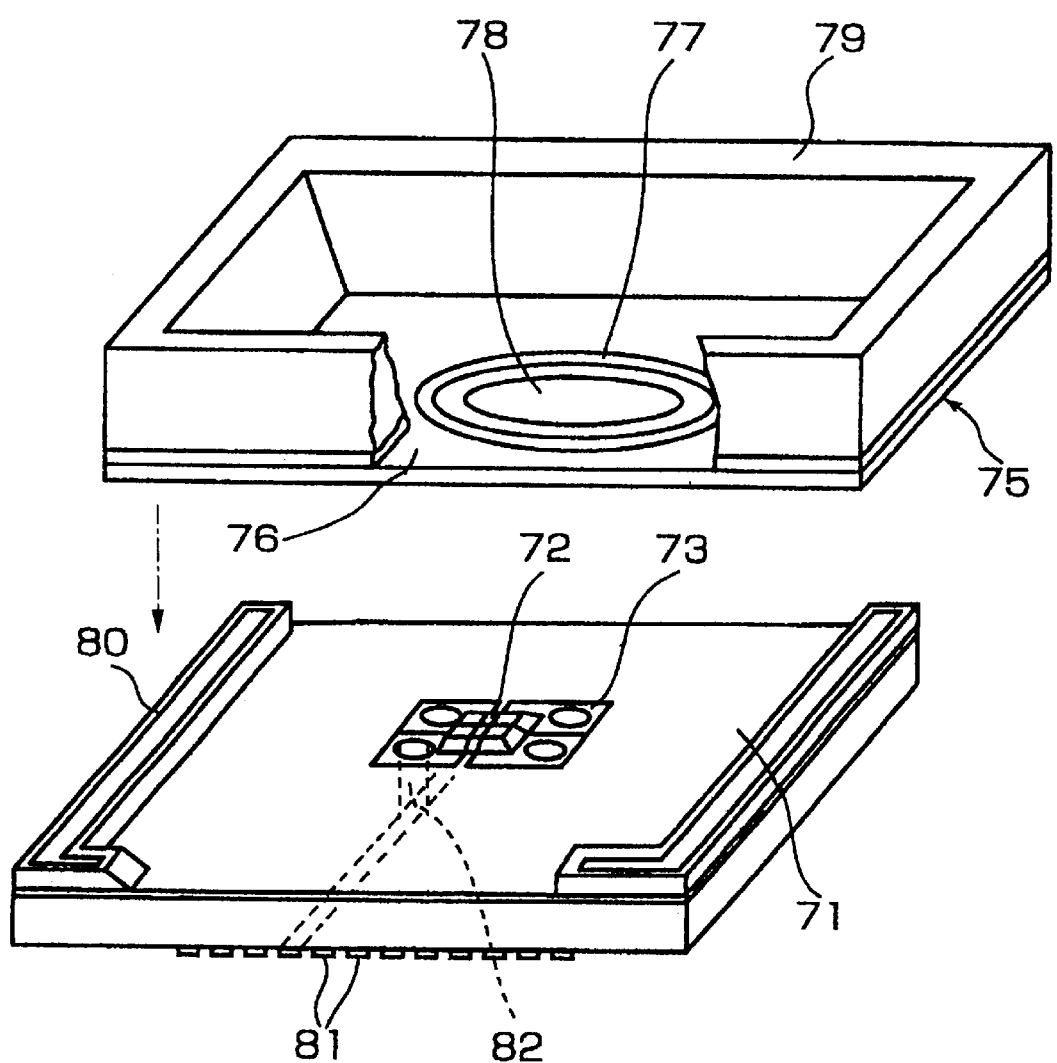
FIG. 11 is a disassembled perspective view showing another micro-mirror apparatus according to the present invention.

FIG. 11 is a disassembled perspective view showing another micro-mirror apparatus according to the present invention. As shown in the figure, wiring 81 is provided on a lower face of the lower substrate 71, that is the page lower face of FIG. 11, and through holes 82 for connecting the lower electrodes 73 to the wiring 81 are provided.

In this micro-mirror apparatus, since the lower electrodes 73 and the wiring 81 are connected via the through holes 82, it is not necessary to wire to avoid the lower electrodes 73 and the support 80. Therefore the pattern width of the wiring 81 for driving the mirror 78 can be made wider.

Figure 12:
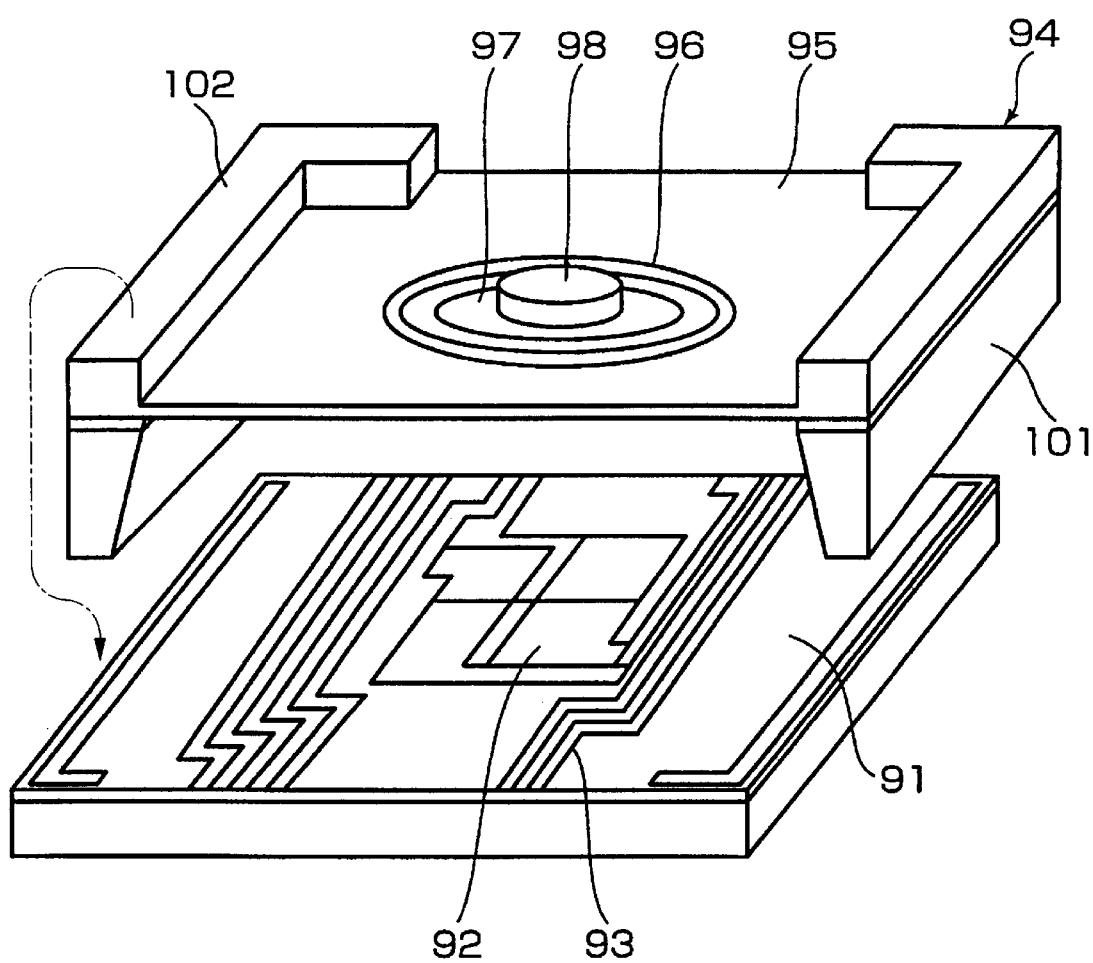
FIG. 12 is a disassembled perspective view showing another micro-mirror apparatus according to the present invention.

FIG. 12 is a disassembled perspective view of another micro-mirror apparatus according to the present invention. As shown in the figure, lower electrodes 92 are provided on an upper face, that is a page upper face in FIG. 12, of a lower substrate (lower electrode substrate) 91 comprising a monocrystalline silicon having a crystal orientation (100), wiring 93 is provided on the lower substrate 91, and the lower electrodes 92 are connected to the wiring 93.

A frame portion 101 comprising monocrystalline silicon having a crystal orientation (100) is provided on an upper substrate (mirror forming substrate) 94, and a base 95 comprising monocrystalline silicon is provided on the frame portion 101. An annular frame 96 is provided inside the base 95, a mirror 97 is provided inside of the frame 96, and a three layer Ti/Pt/Au layer is provided on the surface of the mirror 97. A protruding portion 98 is provided on the rear face of the mirror 97.

As with the micro-mirror apparatus shown in FIG. 1, the base 95 and the frame 96 are connected by torsion springs (not shown in the figure) at two places, and the frame 96 and the mirror 97 are connected by torsion springs (not shown in the figure) at two places. The base 95, the frame 96, the mirror 97 and the torsion springs all comprising monocrystalline silicon, are integrally formed.

Supports 102 are provided at opposite side portions of the base 95. The supports 102 are fixed to the lower substrate 91 with solder, so that the upper substrate 94 is bonded to the lower substrate 91. That is to say, in this embodiment, the upper substrate 94 shown in FIG. 12 is turned upside down, that is the front and rear are reversed, so that the upper substrate 94 is bonded to the lower substrate 91.

In this micro-mirror apparatus, since the protruding portion 98 is provided on the rear face of the mirror 97, the gap between the lower electrodes 92 and the mirror 97, that is the inter-electrode gap can be made small, and since as mentioned above electrostatic force is inversely proportional to the square of the inter-electrode gap, the mirror 97 can be tilted even more.

Figure 13:
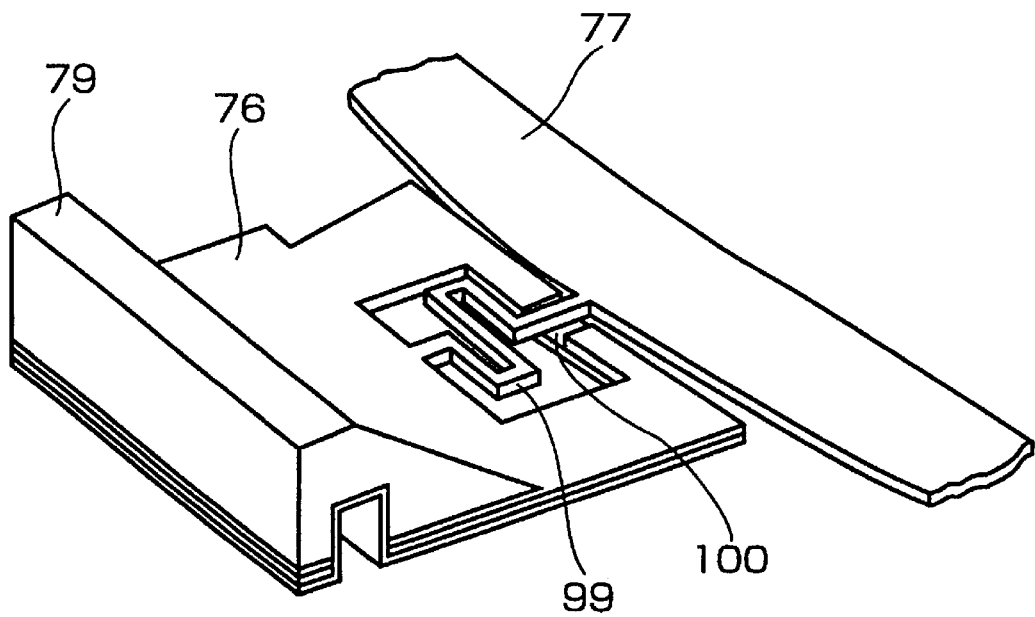
FIG. 13 is a perspective view showing a part of the micro-mirror apparatus shown in FIG.12.

FIG. 13 is a perspective view showing a part of another micro-mirror apparatus according to the present invention. As shown in the figure, a torsion spring 99 is provided between a base 76 and a frame 77, and a retention portion 100 is provided for preventing the occurrence of bending due to the weight of the mirror 78 portion and the electrostatic force F.

The production method for the micro-mirror apparatus shown in FIG. 13 will now be explained using FIG. 14A through 14D and FIG. 15A through 15C.

Figure 14A:
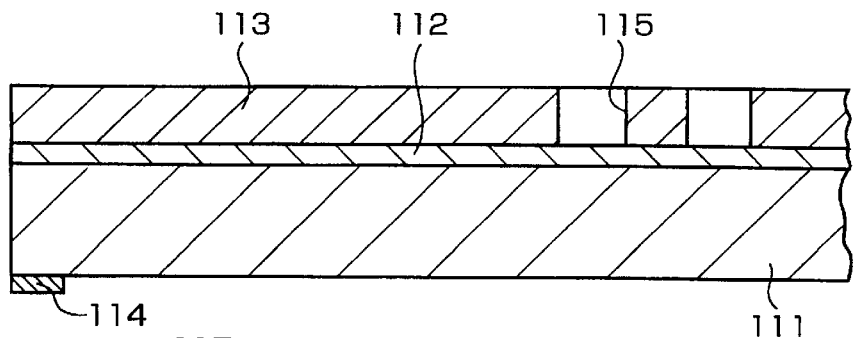
FIG. 14A through FIG. 14D are explanatory diagrams of a production method for the micro-mirror apparatus shown in FIG. 12 and FIG. 13.

As shown in FIG. 14A, a silicon oxide layer 112 is provided on a support substrate 111 comprising a monocrystalline silicon. Furthermore a silicon layer (SOI layer) 113 is provided on the silicon oxide layer 112, and a connection portion 114 comprising three layers of Ti/Pt/Au is provided on a lower portion of the SOI substrate. An etching layer is formed on the silicon layer 113, and a slot (hole) 115 is formed in the silicon layer 113.

Figure 14B:
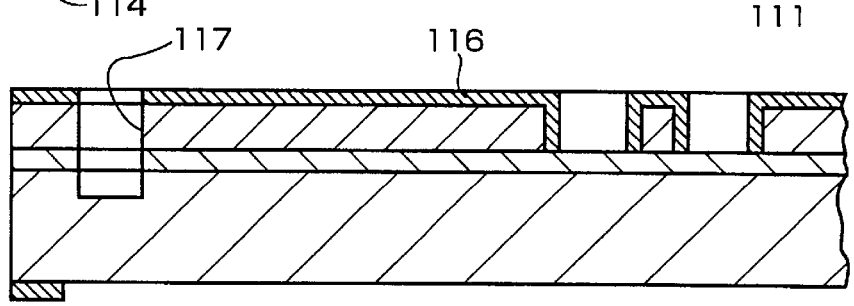

Next, as shown in FIG. 14B, after oxidizing the surface of the silicon layer 113 to form a silicon oxide layer 116, a slot (hole) 117 which reaches to the support substrate 111 is formed by etching. In this case, after reactive etching the silicon oxide layer 116 with a CF based gas, the silicon layer 113 is etched using ICP with an $SF_6$ gas. Then, after further reactive etching the silicon oxide layer 112 with the CF based gas, the support substrate 111 is etched using ICP with $SF_6$ gas.

Figure 14C:
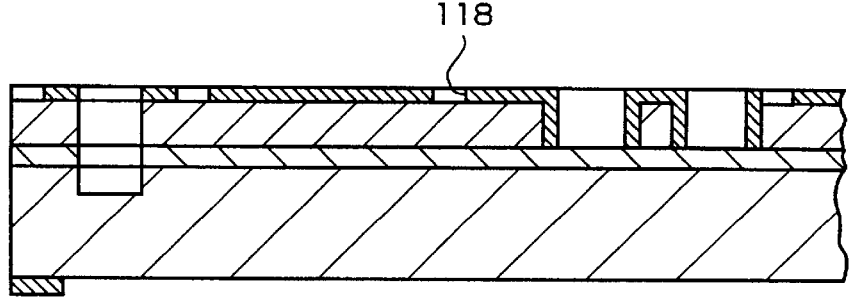
Figure 14D:
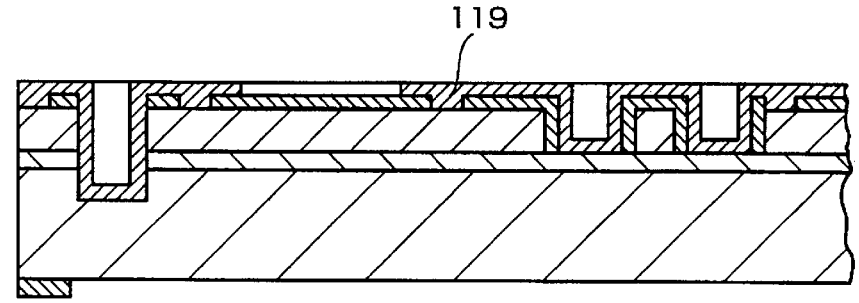

Next, as shown in FIG. 14C, a slot (hole) 118 is formed in the silicon oxide layer 116 by etching. Then, as shown in FIG. 14D, a polysilicon layer 119 is formed on the surface, after which a part of the polysilicon layer 119 is removed by etching.

Figure 15A:
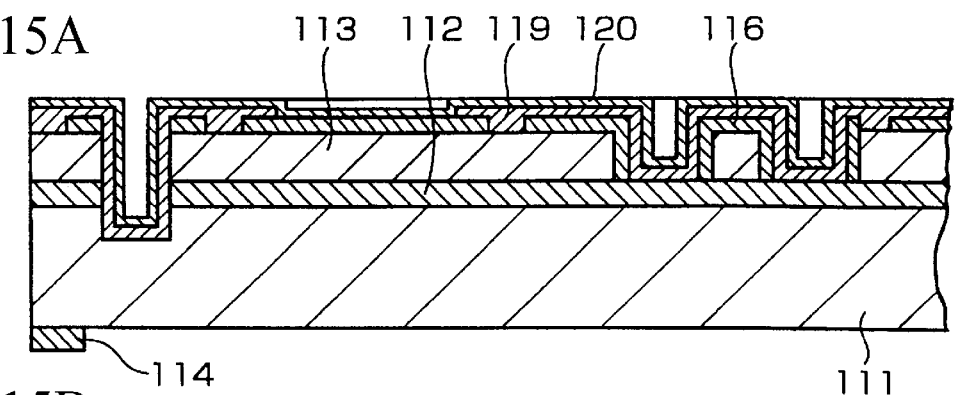
FIG. 15A though FIG. 15C are explanatory diagrams of the production method for the micro-mirror apparatus shown in FIG. 12 and FIG. 13.
Figure 15B:
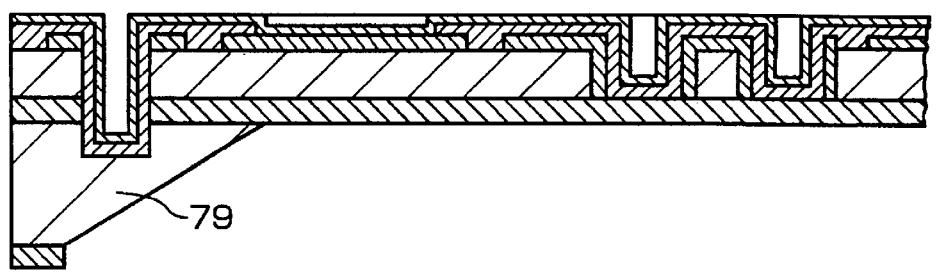

Then, as shown in FIG. 15A, a silicon oxide layer (passivation film) 120 is formed on the surface by PCVD. Next, as shown in FIG. 15B, a frame portion 79 is formed by back etching the support substrate 111.

Figure 15C:
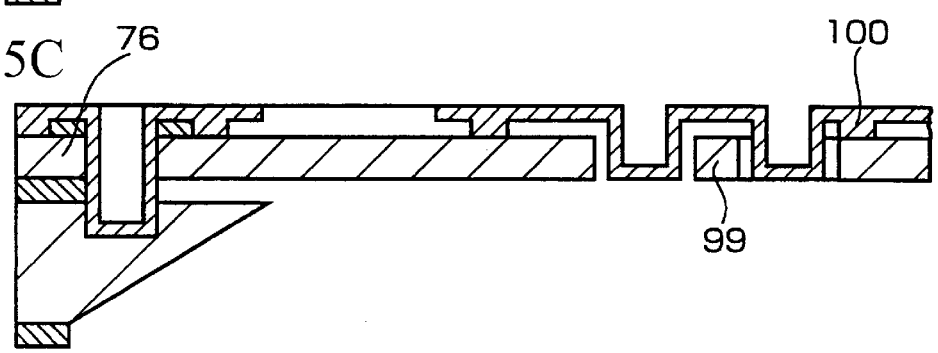

Then, as shown in FIG. 15C, the oxide silicon layers 112, 116 and 120 are removed by soaking in a buffer hydrofluoric acid, to thereby form the torsion spring 99 and the retention portion 100.

In the production method for this micro-mirror apparatus, since the slot 117 passes through the silicon oxide layer 112, the silicon oxide layers 112 is removed by soaking in the buffer hydrofluoric acid. However at this time, in the base 76, removal of the silicon oxide layer 112 can be prevented. Therefore, in the base 76, the support substrate 111 (frame portion 79), and the silicon layer 113 are not separated.

In the abovementioned respective embodiments, an SOI substrate is used as the substrate, that is the upper substrate, however a SIMOX substrate may be used as the substrate.

Furthermore, in the abovementioned respective embodiments, silicon oxide layers 42, 45, the central layer 52, and the silicon oxide layer 112 are used as the oxide layer, however other oxide layers may be used.

Moreover, in the above respective embodiments, a single mirror 33, 78 is provided on the upper substrate 27, 75. However many mirrors (an array mirror) may be provided on the upper substrate. In this case, when wiring for driving the mirrors is provided on the lower substrate, and through holes for conducting between the lower electrodes and the wiring are provided in the lower substrate, the pattern width of the wiring can be made wider.

Furthermore, in the abovementioned respective embodiments, the silicon oxide layer 45 is provided on the support substrate 50 comprising monocrystalline silicon, and a three layer construction substrate with a lower silicon layer 41, a silicon oxide layer 42 and an upper silicon layer 43 provided on the silicon oxide layer 45 is used. However the construction may be such that a glass particle (soot) with silica as the principal ingredient, is deposited on one of the two SIMOX substrates which has been subjected to epitaxial grain growth, and the other SIMOX substrate is superposed thereon and sintered to thereby bond the two SIMOX substrates (refer to Japanese Unexamined Patent Application, First Publication No. 61-242033). Then the substrate is made by polishing and etching.

Next is a description of an embodiment which can prevent the mirror 33 and the protruding portion 34 from contacting over a large area (referred to as pull-in).

Since electrostatic force F is inversely proportional to the square of distance d, as soon as the mirror becomes closer than a certain predetermined distance to the protruding portion 34, there is a case where the electrostatic force F becomes slightly larger than the restoring force of the torsion springs 35 and 36 for returning to the mirror 33 to the original position, so that the mirror 33 and the protruding portion 34 contact over a large area.

This pull-in is more likely to occur with the distance d being made as small as possible so that the mirror 33 is turned with a small voltage V, and the smaller the spring constant of the torsion springs 35 and 36 and the closer the tilt limit value comes to a value just on a threshold value which causes pull-in. Therefore, so that the threshold value causing pull-in is not exceeded, the voltage must be very accurately controlled over several milli seconds. This attitude control of the mirror 33 over several milli seconds corresponds to switching time.

When the mirror 33 is pulled in, the electrode of the mirror 33 and the lower electrodes 22 are shorted, so that the electrode of the mirror 33 and the lower electrodes 22 are damaged. In the case of an array mirror, since the spring coefficient of the torsion springs 35 and 36 of the respective mirrors 33 are not equal, there is the case where the electrostatic forces F causing pull-in of the mirror 33 differ. In this case, the characteristics of the respective mirrors 33 differ significantly so that this cannot be put to practical use.

When the rotation of the mirror 33 becomes large, the edge of the mirror 33 (perimeter portion) and the lower substrate 21 contact at a point. Therefore a stress concentration momentarily occurs at the edge of the mirror 33, making the mirror susceptible to damage. Furthermore, if the mirror is thin and thus susceptible to deformation, this can incline to make the, distance d which brings about pull-in less than the threshold value. Moreover, even if pull-in does not arise, when the mirror 33 is made to approach the lower electrodes 22 and 23 by the electrostatic force F, that is when the mirror 33 is shifted towards the lower electrodes 22 and 23, the optical axis of the light beam incident on the mirror 33 shifts. Therefore, any shift of the mirror 33 towards the lower electrode 22 and 23 must be kept as small as possible.

The present invention is aimed at solving such problems. In order to achieve this object, in the present embodiment, a micro-mirror apparatus having a mirror and a lower substrate provided with lower electrodes, is provided with a protuberance comprising an insulating material, on a part where the lower electrodes of the lower substrate are provided.

Figure 16:
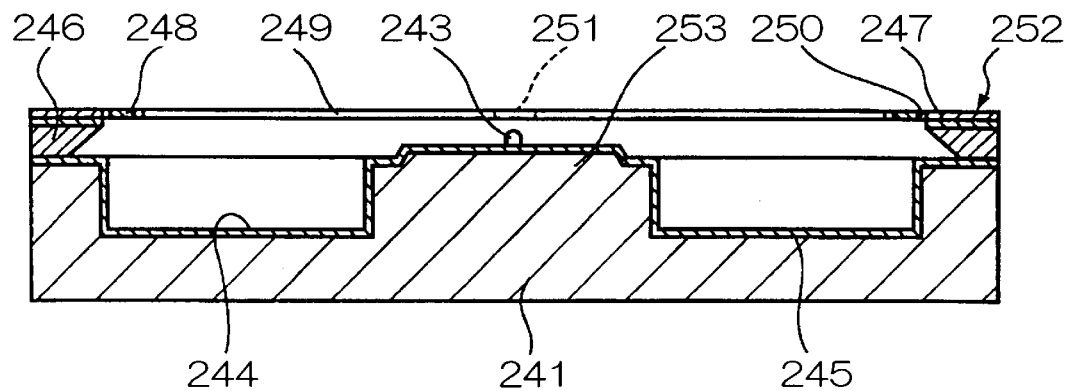
FIG. 16 is an outline sectional drawing showing a micro-mirror apparatus according to the invention.
Figure 17:
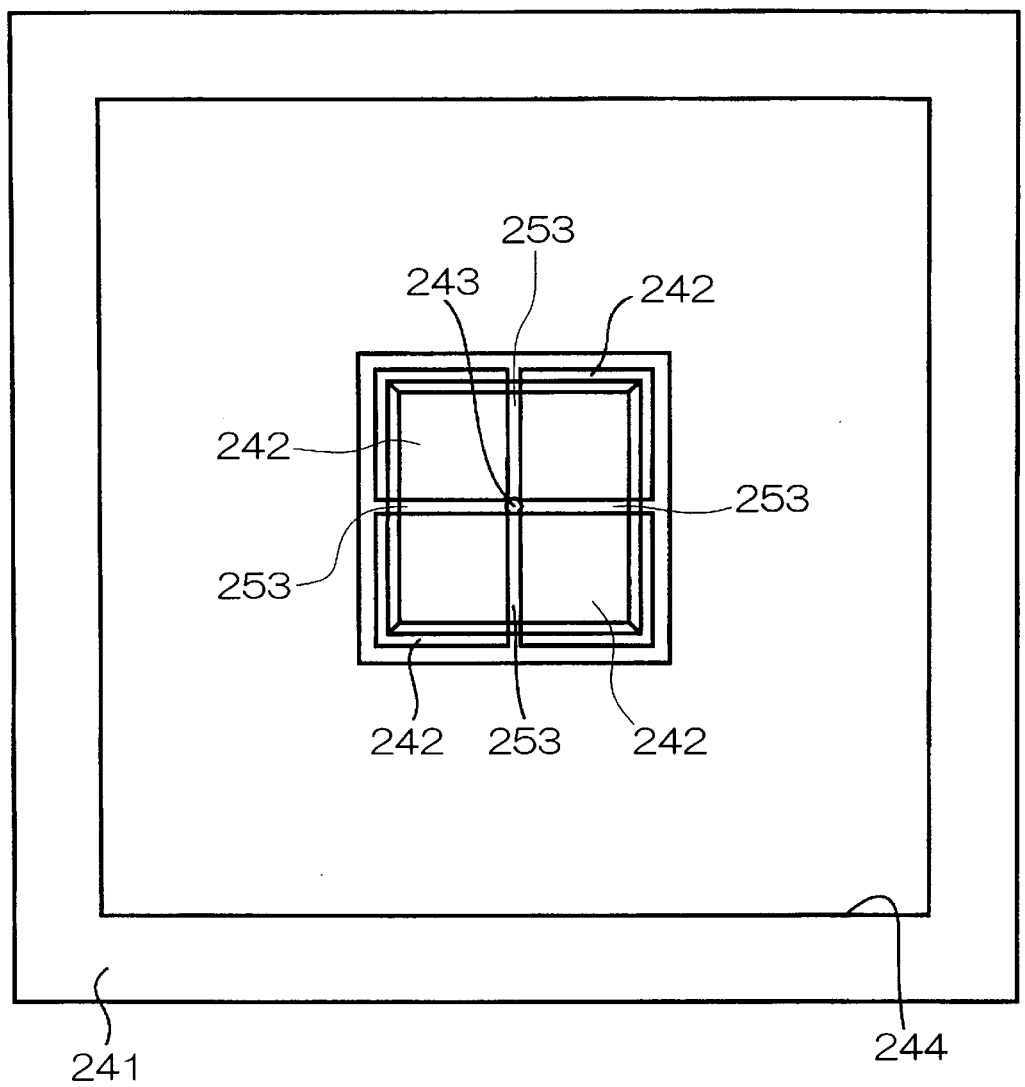
FIG. 17 is an outline plan view showing a lower substrate of the micro-mirror apparatus shown in FIG. 16

FIG. 16 is an outline section view showing a micro-mirror apparatus according to this embodiment, while FIG. 17 is an outline plan view showing a lower substrate of the micro-mirror apparatus shown in FIG. 16. As shown in the figures, a protruding portion 253, 40 $\mu$m high is provided on the lower substrate (lower electrode substrate) 241 comprising monocrystalline silicon having a crystal orientation (100), and lower electrodes 242 are provided on the protruding portion 253. A protuberance 243 with a surface comprising an insulating material and with a height of 5 $\mu$m and a width of 3 $\mu$m, is provided at the center of the protruding portion 253, that is at the center of the lower electrodes 242. A recess 244 is provided surrounding the lower electrodes 242, and an insulating film 245 is provided on the surface of the lower substrate 241 including the side wall upper portion of the recess 244 and the opening edge portion. The lower electrodes 242 are provided on the insulating film 245.

Supports 246 comprising monocrystalline silicon having a crystal orientation (100) are provided on an upper substrate (mirror forming substrate) 252 comprising an SOI substrate, and the supports 246 are attached to the lower substrate 241, to thereby bond the upper substrate 252 to the lower substrate 241.

A base 247 comprising monocrystalline silicon with a thickness of approximately 10 $\mu$m is provided on the supports 246, an annular frame 248 is provided inside the base 247, and a mirror 249 is provided inside of the frame 248. An electrode comprising three layers of Ti/Pt/Au is provided on the surface of the mirror 249. The mirror 249 is supported in space by the support 246, and the distance between the lower electrodes 242 and the mirror 249 is 20 $\mu$m. Furthermore, the base 247 and the frame 248 are connected by torsion springs 250 at two places, the same as the torsion springs shown in FIGS. 4, 7 and 9, and the frame 248 and the mirror 249 are connected by torsion springs 251 at two places, which are formed in a similar manner to the torsion springs 250. A line through the two torsion springs 250 and a line through the two torsion springs 251 are orthogonal. The base 247, the frame 248, the mirror 249 and the torsion springs 250 and 251 all comprising monocrystalline silicon of a thickness of approximately 10 $\mu$m are integrally formed.

Next, is a description of a production method for the micro-mirror apparatus shown in FIG. 16 and FIG. 17. At first, oxygen irons are implanted into the monocrystalline silicon substrate having a crystal orientation (100), to form a silicon oxide layer of a uniform depth giving a SIMOX substrate. Monocrystalline silicon is then grown on the active layer of the SIMOX substrate by epitaxy to form an SOI layer of approximately 10 $\mu$m thickness, thus preparing an SOI substrate. Then, the SOI layer of the SOI substrate is doped with impurities to give an impurity concentration of $1 \times 10^{20}$, so that the resistance becomes several thousandths $\Omega$cm. Next, a reflection coating comprising three layers of Ti/Pt/Au is formed by lift-off. Connection portions comprising three layers of Ti/Pt/Au are then patterned on the rear face of the support substrate of the SOI substrate using a two face aligner to match with the mirror pattern on the front face thereof. Next, the SOI layer is etched using ICP (inductively-coupled plasma), to thereby integrally form the base 247, the frame 248, the mirror 249 and the torsion springs 250 and 251. Then after forming a silicon oxide layer (passivation film) on the surface with PCVD (plasma CVD) to protect the surface, the support substrate of the SOI substrate is etched with an etchant of KOH to form the supports 246.

Next the protuberance 243 is formed on the central portion of the monocrystalline silicon having an orientation direction (100) by anisotropic etching, the protruding portion 253 is formed by masking the protuberance 243 and etching the monocrystalline silicon substrate with KOH, the recess 244 is formed around the protruding portion 253 of the monocrystalline silicon substrate, the insulating film 245 is formed by thermal oxidation of the surface of the monocrystalline silicon substrate, and the surface of the protuberance 243 is made of an insulating material. Furthermore, the lower electrodes 242 are formed on the insulating film 245, and a three layer Ti/Pt/Au layer is formed on a surrounding portion of the monocrystalline silicon substrate, after which a solder portion comprising AuSn is formed on the Ti/Pt/Au layer. Next, after aligning the lower substrate 241 and the upper substrate 252, the connection portions are pressed against the solder portions and heated to 390° C. so that the solder of the solder portions is melted to thereby bond the upper substrate 252 to the lower substrate 241.

Figure 18:
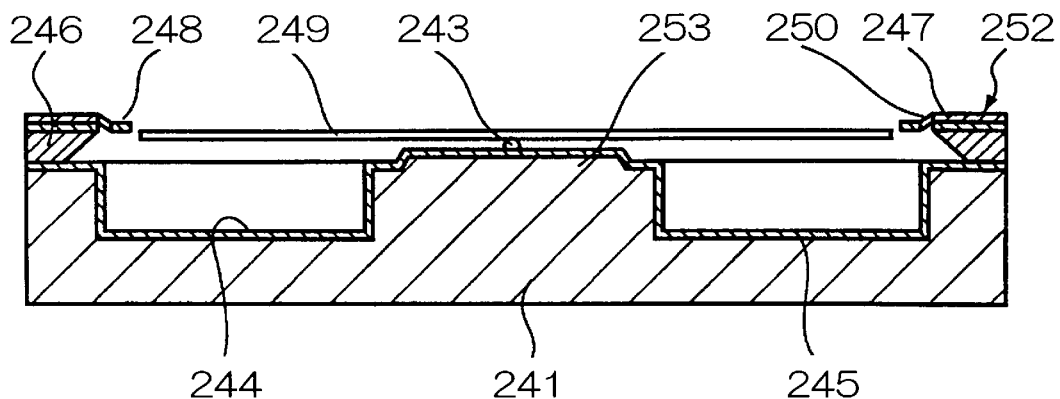
FIG. 18 is a diagram for explaining the operation of the micro-mirror apparatus shown in FIG. 16 and FIG. 17.

In this micro-mirror apparatus, when a large voltage is symmetrically applied to the lower electrodes 242, then as shown in FIG. 18, the mirror 249 moves towards the lower substrate 241, that is in the page downwards direction in FIG. 18. However since the mirror 249 contacts with the protuberance 243, the mirror 249 and the protruding portion 253 are not contacted over a large area. Moreover pull-in does not occur.

Figure 19:
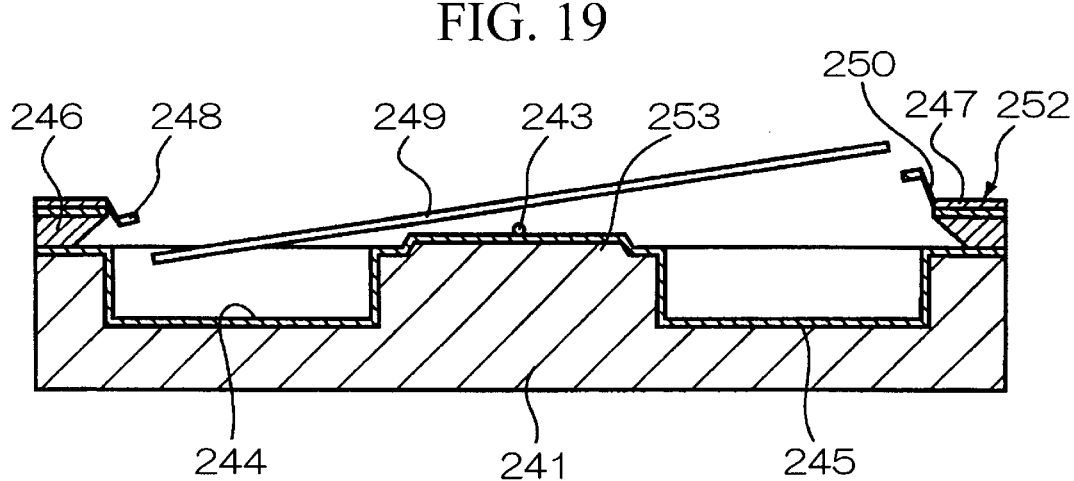
FIG. 19 is a diagram for explaining the operation of the micro-mirror apparatus shown in FIG. 16 and FIG. 17.

Furthermore, when a large voltage is asymmetrically applied to the lower electrodes 242, then as shown in FIG. 19, the mirror 249 tilts significantly. However since the edge of the mirror 249 is located inside the recess 244, the edge of the mirror 249 does not contact with the lower substrate 241.

For example if a voltage difference of a 95 V difference is applied to all electrodes on one side of the lower electrodes 242, the mirror 249 can be made to tilt by only 12°. At this point in time, the central portion of the mirror 249 contacts with the protuberance 243, and at the same time the surroundings of the mirror 249 contact with the edge of the recess 244 on a line.

Figure 20:
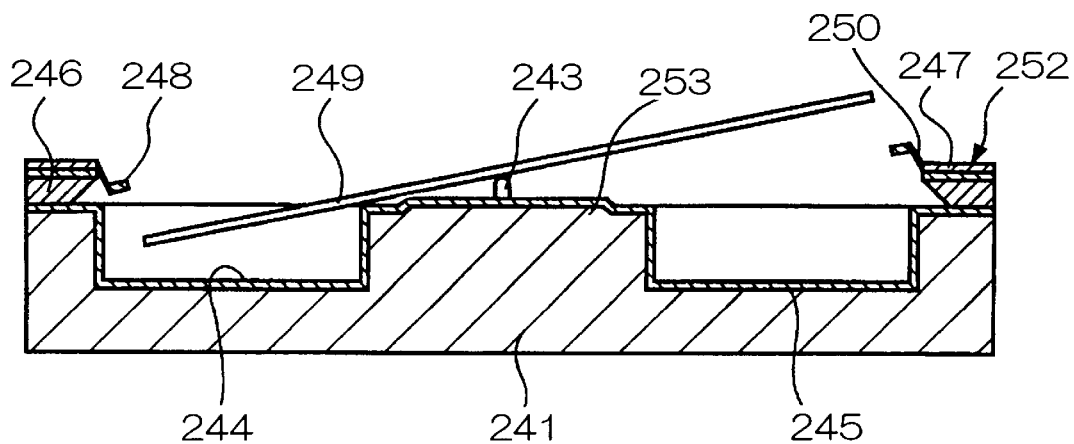
FIG. 20 is a diagram for explaining the operation of the micro-mirror apparatus shown in FIG. 16 and FIG. 17.

Furthermore, even if a voltage of a 200 V difference is applied to the lower electrodes 242, the mirror 249 only contacts the protuberance 243, and the contact area thereof is narrow. Hence pull-in does not occur. In order to demonstrate that pull-in does not occur, when in addition to applying a voltage of a 200 V difference to the lower electrodes 242, a voltage of a difference of several tens of volts is applied asymmetrically to the lower electrodes 242, the mirror 249 can be made to turn. Then, even if a voltage of a 200 V difference considerably exceeding the 95 V applied for the maximum turning angle, is asymmetrically applied to the lower electrodes 242 to give turning, the contact portion of the mirror 249 and the lower substrate 241 is only the protuberance 243 and the upper rim of the recess 244, being unchanged from the case with a voltage difference of 95 V (refer to FIG. 20).

Furthermore, since the edge of the mirror 249 does not impact on the lower electrodes 242, there is no damage to the mirror 249 at all.

If the same experiment is performed without the protuberance, since pull-in occurs at a voltage difference of 70 V, rotation control must be so that rotation is performed with a voltage difference less than 65 V. Hence the possible rotation angle for the mirror is limited to ±6 degrees. With the present invention, since movement of the mirror 49 is stopped by the protuberance 243 and the rim of the recess 244 formed with the insulating film 245, pull-in does not occur, and also shorting does not occur.

As described above, in this micro-mirror apparatus, since the mirror 249 is not subjected to the occurrence of pull-in, and hence the electrode of the mirror 249 and the lower electrodes 242 do not short, the electrode of the mirror 249 and the lower electrodes 242 are not damaged. Furthermore, in the case of an array mirror, even if the spring constants of the torsion springs 250 and 251 of the respective mirrors 249 are not equal, these can be put to practical use. Moreover, even if the rotation of the mirror 249 becomes fairly large, since the mirror 249 does not contact with the lower substrate 241, damage to the mirror 249 can be prevented.

Furthermore, since the insulating film 245 is provided at least on the side wall upper portion and the opening edge of the recess 244, then even if for example the rotation of the mirror 249 is very large so that the mirror 249 contacts with the lower substrate 241, damage to the mirror 249 can be reliably prevented.

Figure 21:
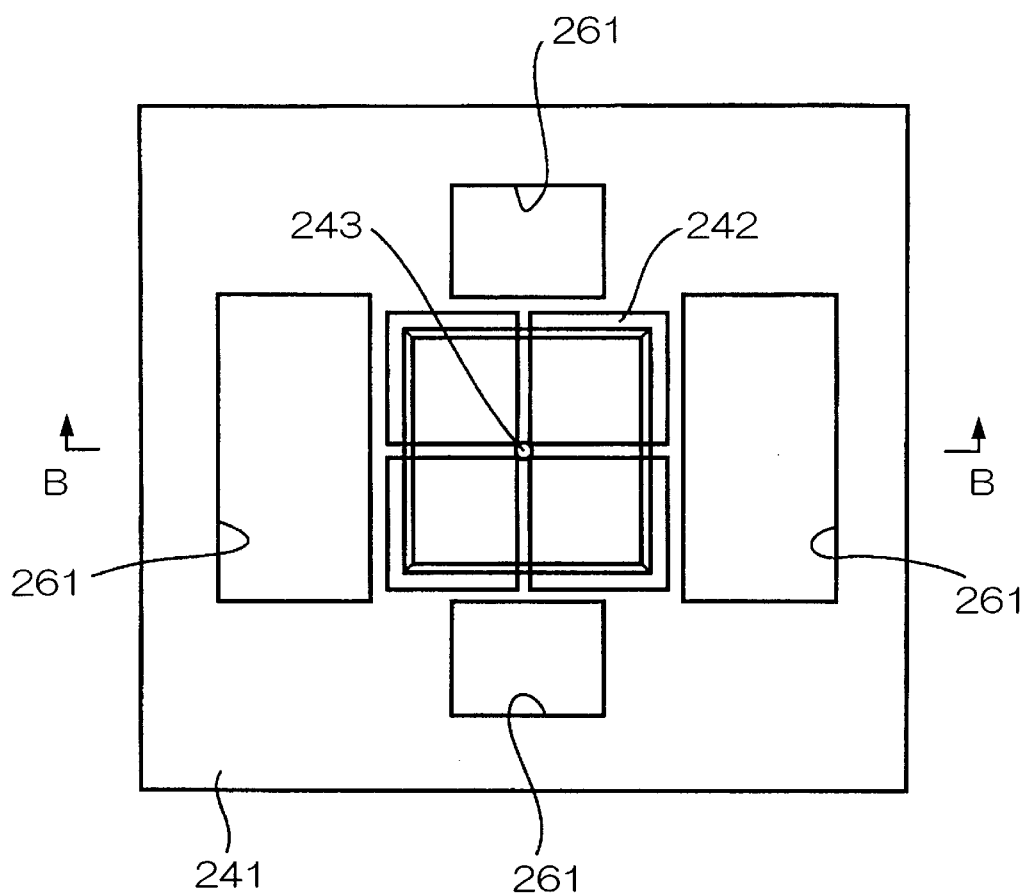
FIG. 21 is an outline plan view showing a lower substrate of another micro-mirror apparatus according to the present invention.
Figure 22:
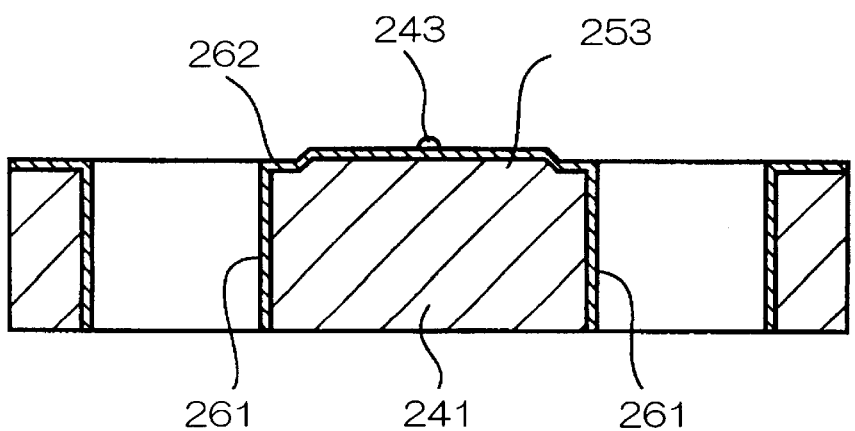
FIG. 22 is a section view on B—B of FIG. 21.

FIG. 21 is an outline plan view showing a lower substrate of another micro-mirror apparatus according to the present invention, while FIG. 22 is a section view on B—B of FIG. 21. As shown in the figures, a hole 261 which pierces the lower substrate 241 is formed in the lower substrate 241, and an insulating film 262 is provided on the surface of the lower substrate 241 including the side wall upper portion and the opening edge of the hole 261.

In the above embodiments, the recess 244 and the hole 261 are provided as concavities, however other concavities may be provided.

Furthermore, in the abovementioned embodiments, the protuberance 243 with a surface comprising an insulating material is provided, however a protuberance made completely from an insulating material may be provided.

Moreover, in the abovementioned embodiments, the protuberance 243 with a height of 5 μm is provided. However if the distance between the mirror and the protuberance for when a voltage is not applied to the lower electrode is made even smaller, contact of the mirror 249 with the lower electrodes 242, that is shift of the mirror 249 towards the lower electrodes 242 can be prevented. Hence there is no shift of the optical axis of the light beam incident on the mirror 249.

Figure 25:
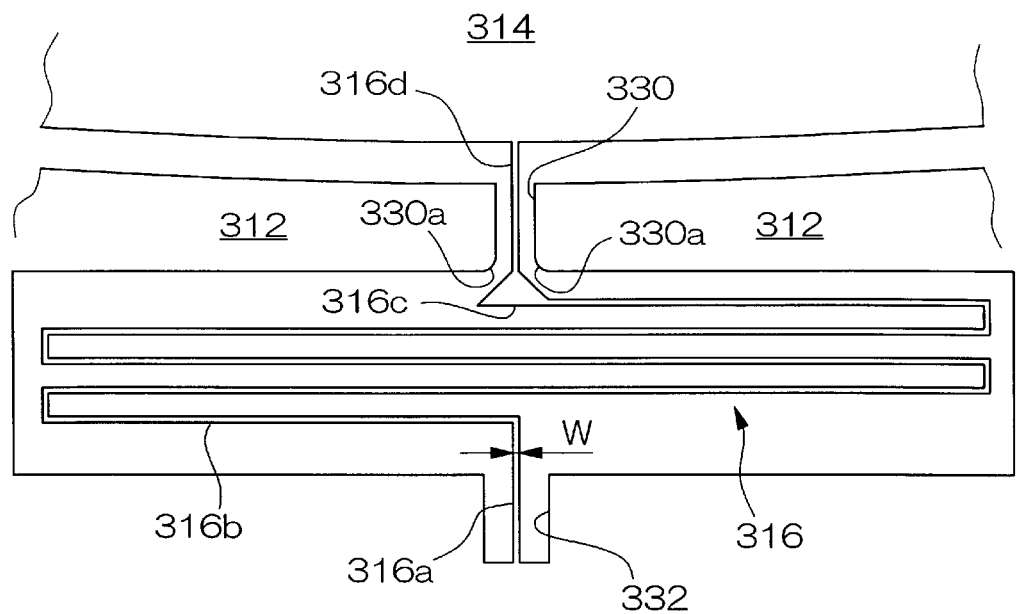
FIG. 25 and FIG. 26 are plan views showing a stopper mechanism for a torsion spring.
Figure 26:
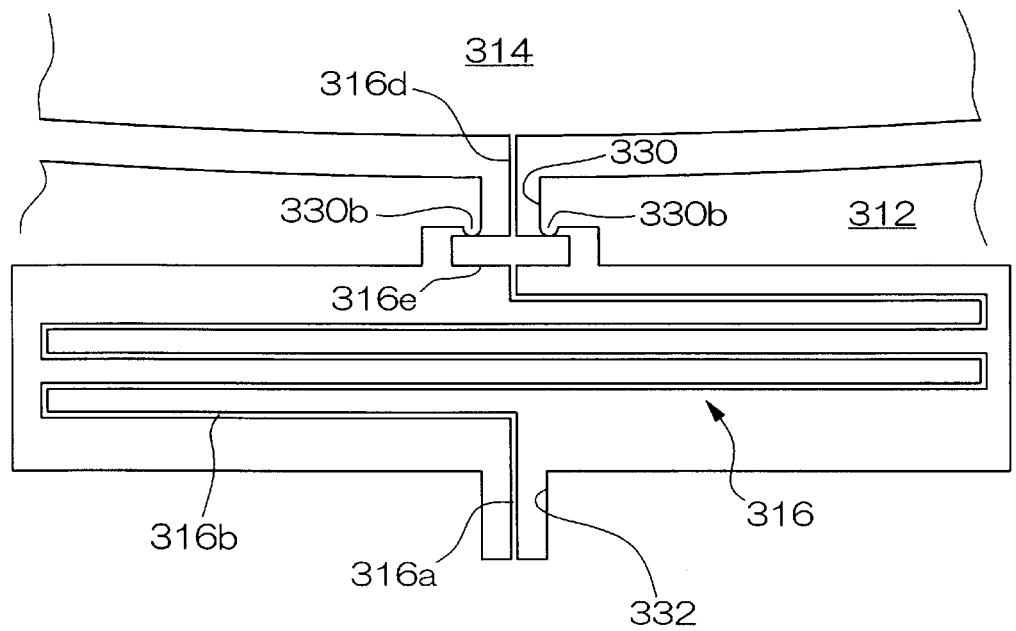
Figure 27:
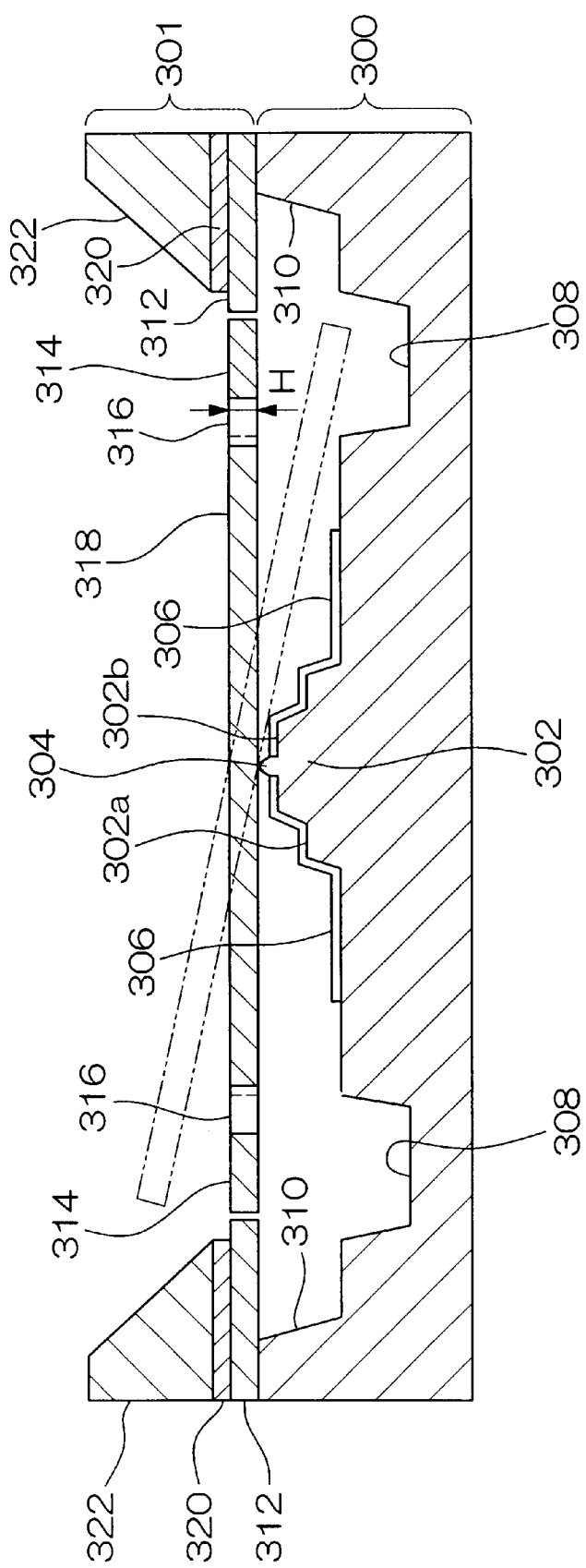
FIG. 27 is a longitudinal section of another embodiment.

FIG. 23 to FIG. 27 show a more specific other embodiment of the present invention. The micro-mirror apparatus of this embodiment, as shown in FIG. 27 has a lower substrate 300 and an upper substrate 301 which are connected in parallel.

Figure 23:
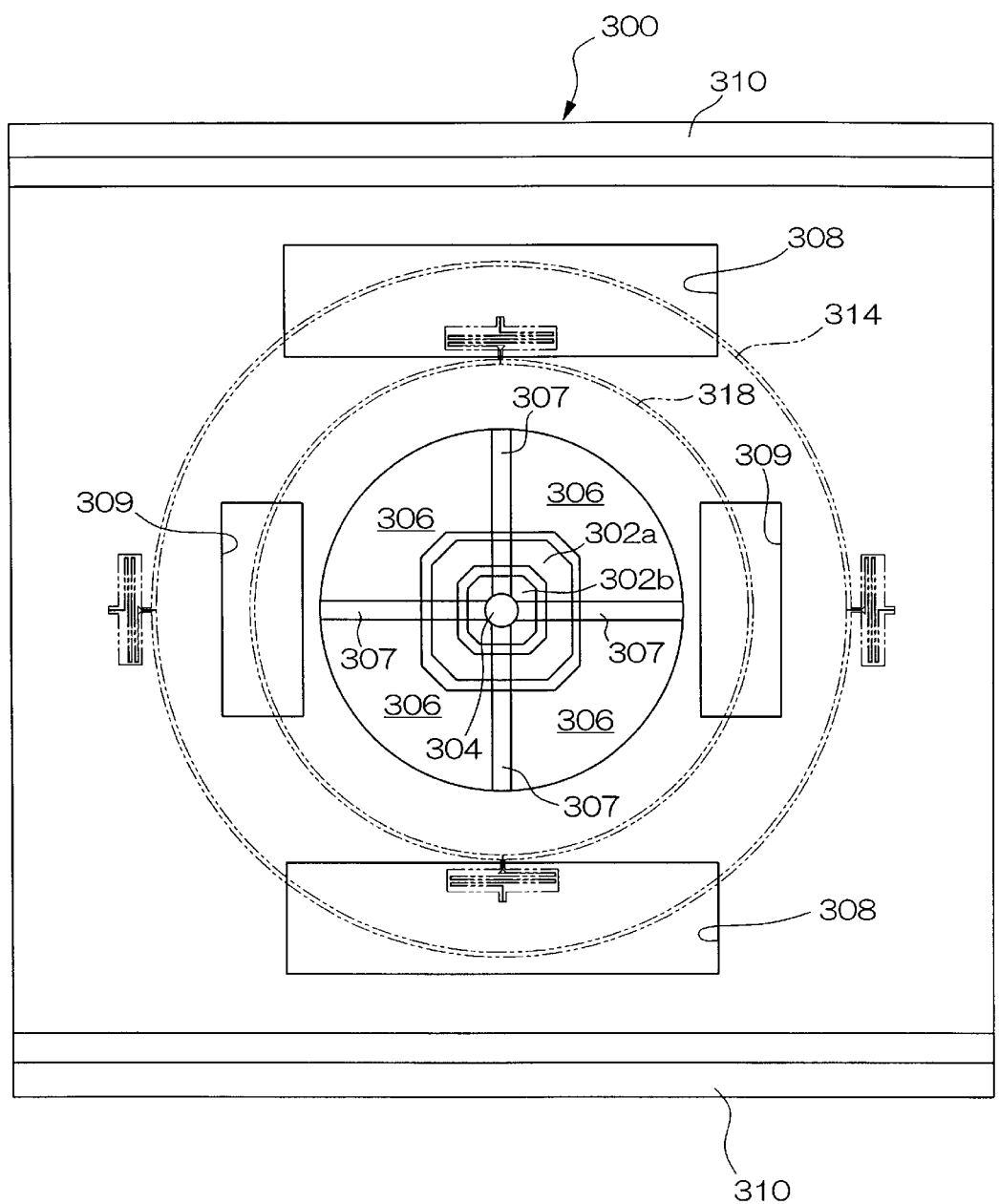
FIG. 23 is a plan view showing a lower substrate of another embodiment of the present invention.

On the lower substrate 300, as shown in FIG. 23, a convex portion 302 is formed on an upper face central portion facing a lower face central portion of a mirror 318. The convex portion 302 has an approximate square shape viewed in plan, and a horizontal upper step 302b of an approximate square shape is formed in the center, and a one step lower horizontal lower step face 302a is formed therearound. A supporting point protuberance 304 is formed at the center of the upper step face 302b facing the central portion of the mirror 318, so that a slight space is formed between the upper step face 302b and the mirror 318. At least the surface of the supporting point protuberance 304 is formed from an insulating material.

Four lower electrodes 306 of respective fan shape are formed on the upper face center of the lower substrate 300 including the outer face of the convex portion 302 so as to constitute a circle concentric with the mirror 318 viewed in plan. The material of the lower electrode 306 is the same as for the abovementioned embodiments. The center of the fan of the lower electrodes 306 coincides with the center of the supporting point protuberance 304, and a space 307 of a constant width is formed between the respective lower electrodes 306. While not shown in the figure, beneath the lower electrodes 306 on the lower substrate 300 is formed respective through holes, and the lower electrodes 306 are connected to a wiring pattern (omitted from the figure) formed on the lower face of the lower substrate 300 through these through holes. By applying a voltage to the lower electrodes 36 and the mirror 318 through the wiring pattern, the mirror 318 can be tilted. At this time, if the mirror 318 is displaced downward more than a predetermined value, the supporting point protuberance 304 contacts with the center of the mirror 318 thus becoming a fulcrum for tilting the mirror 318.

The number of lower electrodes 306 in this embodiment is four, however provided this is three or more, the mirror 318 can be tilted in optional directions. However, in consideration of ease of wiring and ease of control, the case with four is preferable.

On the upper face of the lower substrate 300, at positions corresponding to two locations on the outer periphery of a ring portion 314, and two locations on the outer periphery of the mirror 318, is respectively formed concavities 308 and 309. The concavities 308 are formed at positions 90° apart from the torsion spring 316 which supports the ring portion 314, while the concavities 309 are formed at positions 90° apart from the torsion spring 316 which supports the mirror 318. As a result, it is possible to adopt a large tilt range for the mirror 318 and the ring portion 314 centered on the torsion springs 316.

Figure 24:
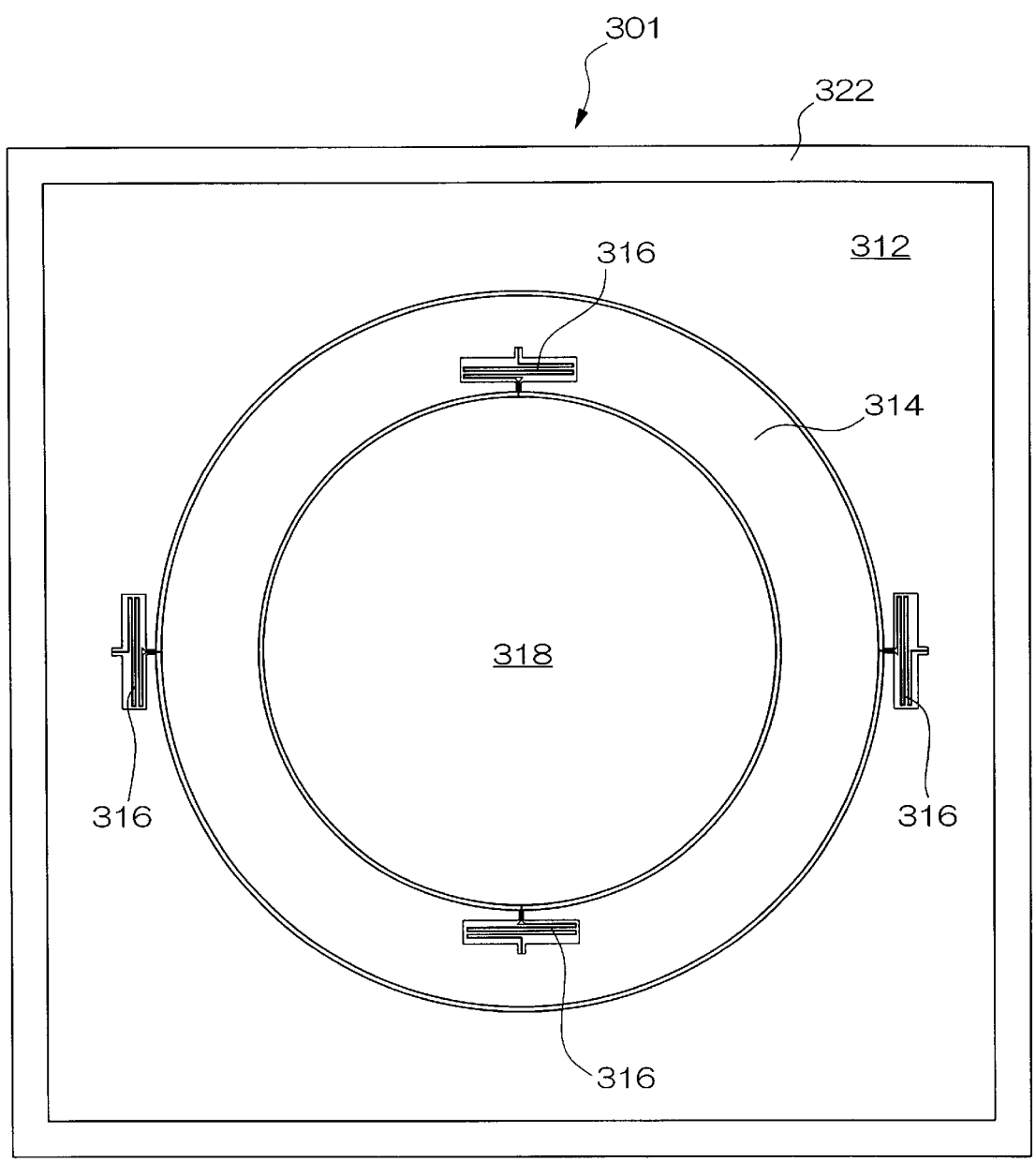
FIG. 24 is a plan view showing an upper substrate of the other embodiment

As shown in FIG. 24, the upper substrate 301 is formed with the central mirror 318, the ring portion 314 surrounding the outer periphery of the mirror 318, the base 312 surrounding the outer periphery of the ring portion 314 and the frame 322 formed on the outer peripheral edge, all integrally formed from a silicon monocrystal. The frame 322 is formed via a silicon oxide film 320. Between the base 312 and the ring portion 314 is connected by the pair of torsion springs 316 which are 180° apart, and between the ring portion 314 and the mirror 318 is connected by the pair of torsion springs 316 at a position 90° apart from the pair of torsion springs 316. These torsion springs 316 are also formed integral with the mirror 318, the ring portion 314 and the base 312.

FIG. 25 shows details of the torsion spring 316. This figure shows the torsion spring 316 for connecting between the ring portion 314 and the base 312. However the torsion spring for connecting between the ring portion 314 and the mirror 318 is exactly the same.

The torsion spring 316 is accommodated inside a concavity 332 formed on the substrate 312, and comprises; a base portion 316a connected to the base 312, a serpentine portion 316b, a stopper 316c formed on the tip end of the serpentine portion 316b, and a tip end portion 316d connected to the ring portion 314 extending from the stopper 316c.

The base portion 316a and the tip end portion 316d extend in the radial direction of the ring portion 314 while the serpentine portion 316b extends in a direction perpendicular to the radial direction. The tip end portion 316d passes through a slit 330 formed in the base 312. The width of the slit 330 is made sufficiently larger than the width of the tip end portion 316d so as to allow twist of the tip end portion 316d.

The base portion 316a, the serpentine portion 316b and the tip end portion 316d have approximately rectangular mutually identical cross-sections, and the aspect ratio h/w of the height h (refer to FIG. 27) to the width w (refer to FIG. 25) is at least 1.8 and preferably 2.5 to 8, and most preferably about 3. By adopting this aspect ratio, the elasticity of the tip end portion 316d in the twist direction can be reduced while increasing the support strength of the ring portion 314 in the vertical direction. Hence the mirror 318 can be tilted with even less electric power.

The stopper 316c of this embodiment is an isosceles triangle prism protruding towards the ring portion 314, and a small clearance is formed with a pair of position restricting portions 330a formed in the slit 330. The width of the stopper 316c is less than the width of the slit 330. Therefore, even in the case where the ring portion 314 is excessively displaced downwards or in the direction to separate from the torsion spring 316, the stopper 316c and the position restricting portions 330a come in contact so that further displacement is restricted. As a result, damage to the torsion spring 316 can be prevented. Also for the torsion spring 316 on the mirror 318 side a similar action is obtained.

FIG. 26 shows a modified example of a stopper mechanism. A stopper 316e of this example is formed as a rectangular parallelepiped having a face perpendicular to the tip end portion 316d. A pair of position restricting portions 330b protruding towards the stopper 316e are formed on the opening rim of the slit 330 of the base 312. These position restricting portions 330b are an approximate semi-circle shape in horizontal section, and a small space is formed with the stopper 316e. Therefore, even in the case where the ring portion 314 is excessively displaced downward, or in the direction to separate from the torsion spring 316, the stopper 316e and the position restricting portions 330b come in contact so that further displacement is restricted. As a result, damage to the torsion spring 316 can be prevented. Furthermore, since the ring portion 314 can slide in an optional direction along the face perpendicular to the radial direction of the ring portion 314 while the stopper 316e and the position restricting portion 330b are in contact, there is minimal restriction to the tilting of the ring portion 314.

According to the micro-mirror apparatus of the above construction, since the stoppers 316c or 316e and the position restricting portions 330a or 330b which restricts the displacement amount of the torsion spring 316 are formed, excess displacement of the ring portion 314 and the mirror 318, and damage to the torsion spring 316 can be prevented.

Furthermore, by forming the convex portion 302 having the lower face 302a and the upper face 302b, to make the mirror center side of the lower electrodes 306 approach the mirror 318, the mirror 318 can be tilted with a comparatively low voltage.

Moreover, by forming the concavities 308 and 309 in the lower substrate 300, the tilt range of the ring portion 314 and the mirror 318 can be extended while keeping down the thickness of the overall device. Moreover, the concavities 308 and 309 may penetrate the lower substrate 300.

Figure 28:
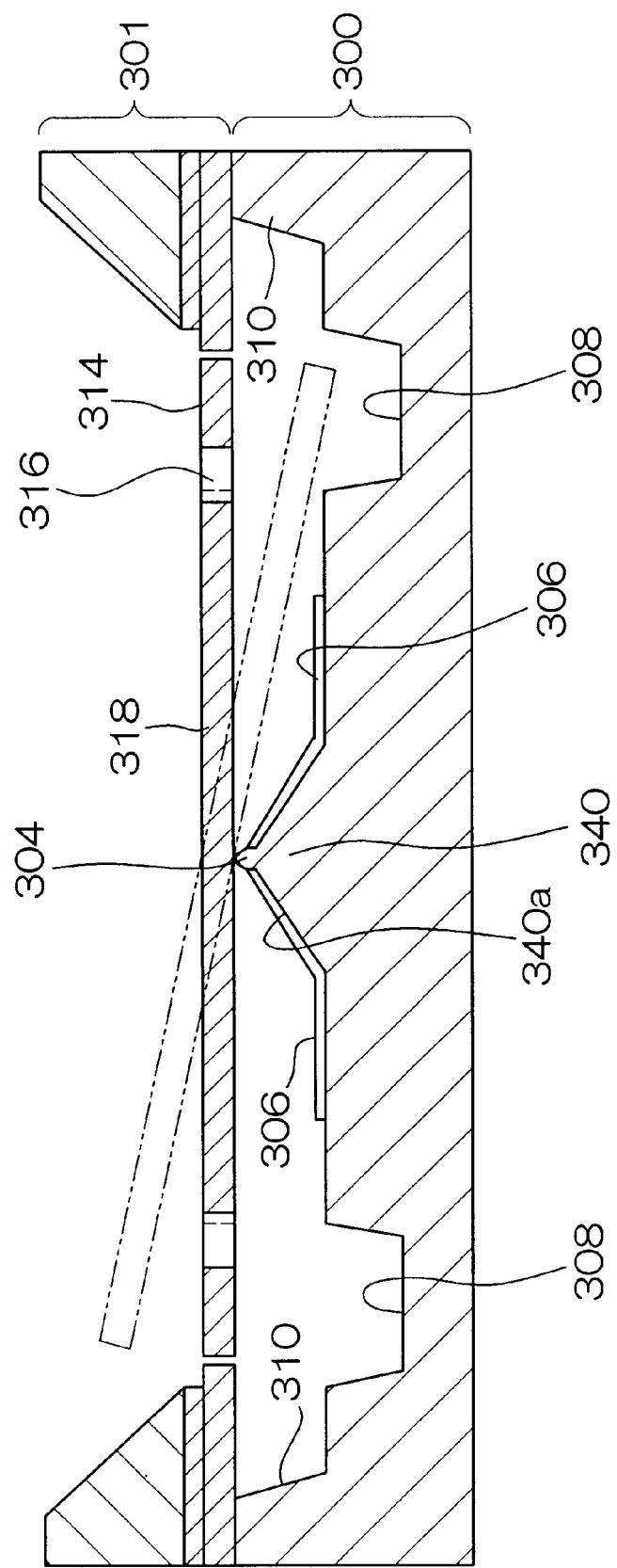
FIG. 28 is a longitudinal section showing another embodiment.

FIG. 28 shows another embodiment of the present invention. In this embodiment, a convex portion 340 formed on the center portion of the lower substrate 300 is a conical shape, and the lower electrodes 306 are also formed on an outer face 340a thereof. Other construction is the same as for the embodiments of FIG. 23 to FIG. 27.

Figure 33:
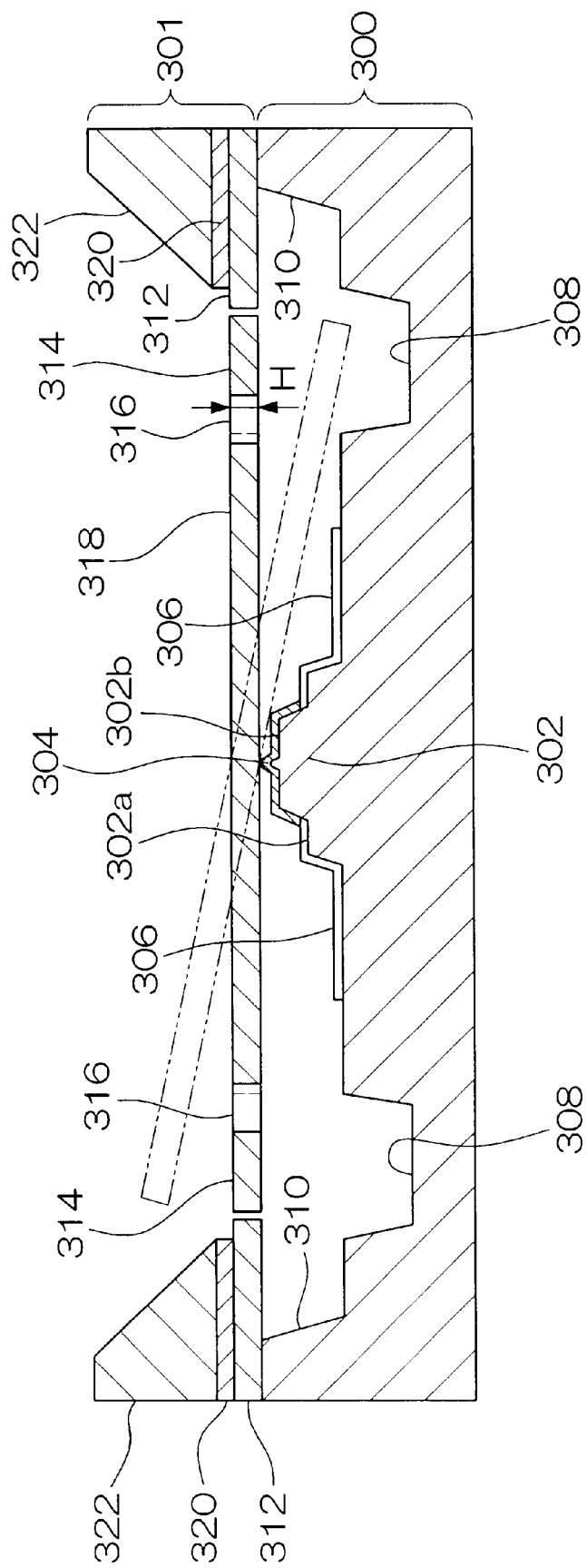
FIG. 33 is a section showing another embodiment.
Figure 34:
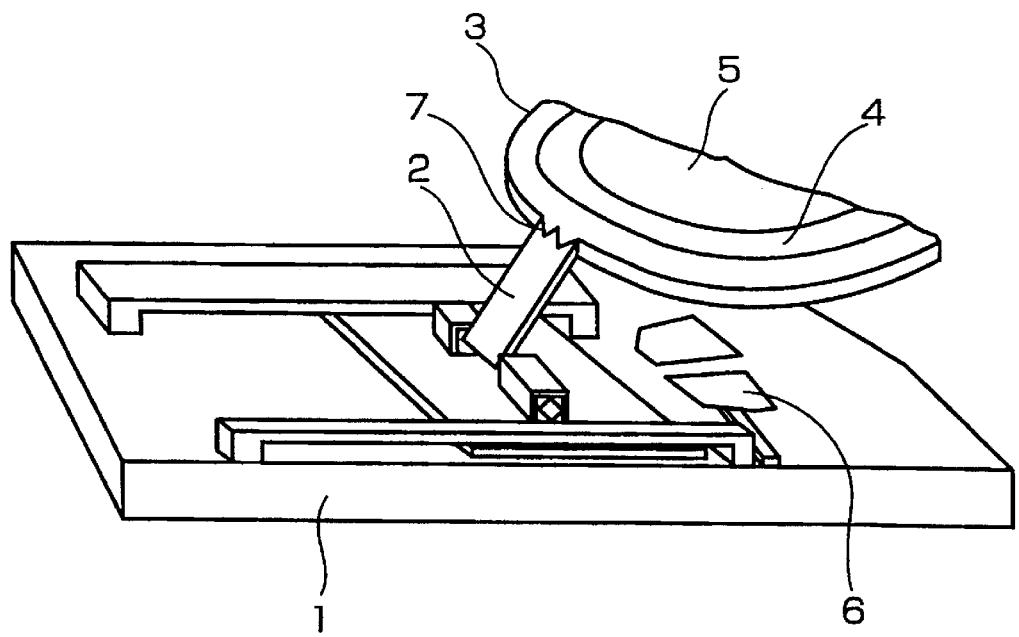
FIG. 34 is an outline perspective view showing a conventional micro-mirror apparatus.
Figure 35:
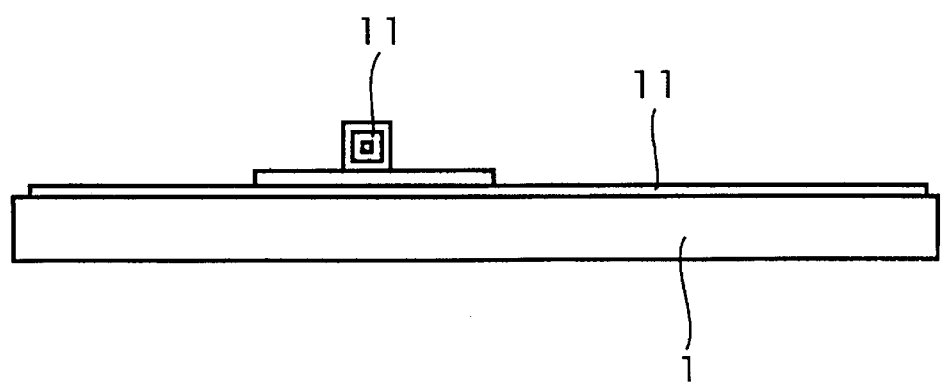
FIG. 35 is an explanatory diagram of a production method for the micro-mirror apparatus shown in FIG. 34.

Furthermore, FIG. 33 shows another embodiment modified from the embodiment of FIGS. 23 to 27. In this embodiment, the upper part (that is, the center part) of the convex portion 302 including the supporting point protuberance 304 and the horizontal upper step 302b is covered with an insulating layer, and the four electrodes 306 are formed on the horizontal lower step face 302a and an area below the horizontal lower step face 302a. By forming the lower electrodes 306 only on a ring shaped area outside the upper (center) part of the convex portion 302, it becomes easy to precisely control the tilting angle of the mirror 318 in comparison with the embodiment shown in FIGS. 23 to 27.

EXAMPLES

Experiment 1

Figure 30:
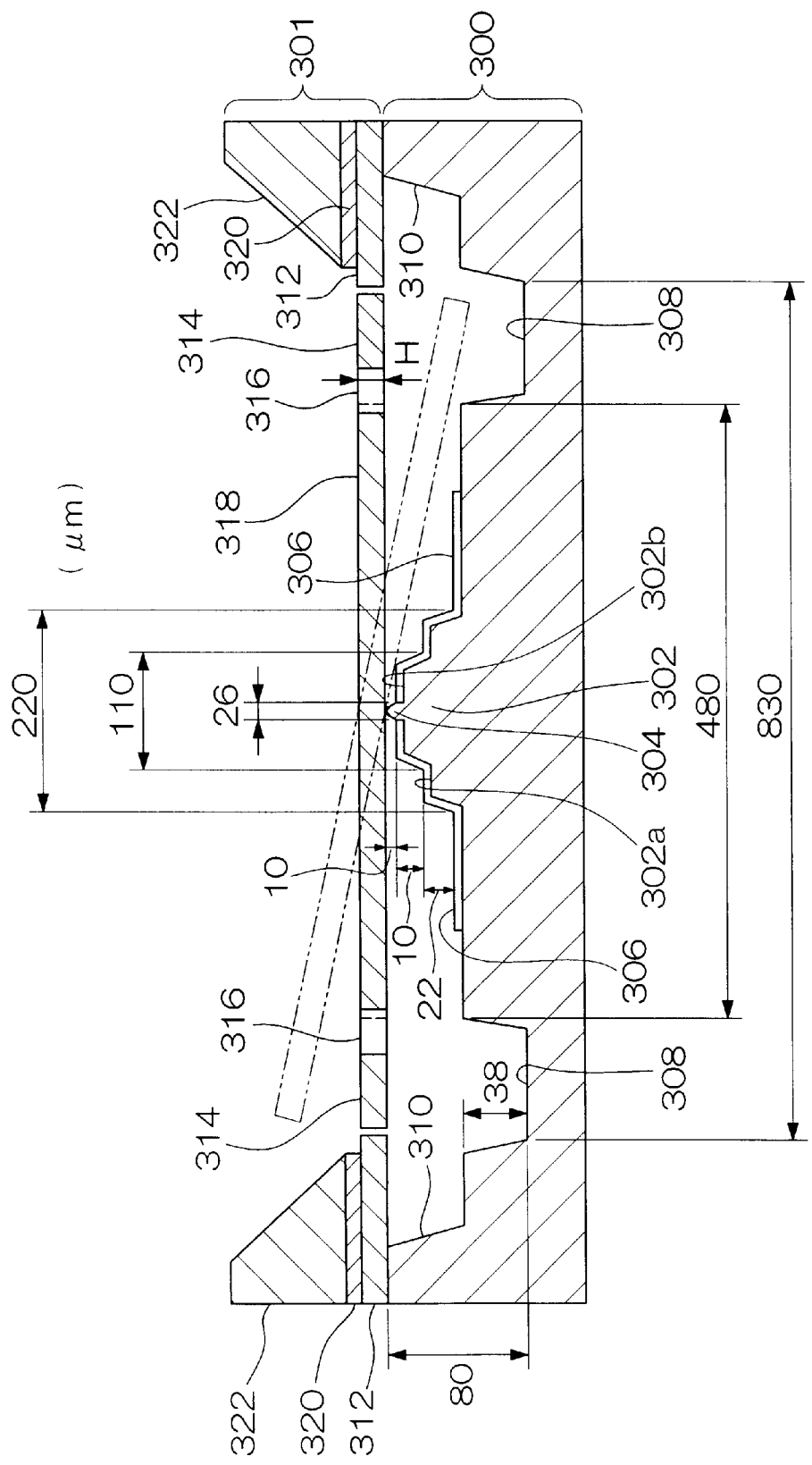
FIG. 30 is a cross-section of Examples of the present invention.

Four examples of the present invention were manufactured. Each of these examples has a common structure shown in FIGS. 23 to 25, and 27, and common sizes thereof are shown in FIG. 30. The aspect ratios (H/W) of the cross-section of the torsion springs 316 in the examples were 0.2, 1.2, 2.0, and 3.0, respectively. Using these examples, the mirror tilting angles at applied voltage of 50 V and the pull-in voltages were respectively measured. The voltage was applied to all of the electrodes on one side of the mirror.

Figure 29:
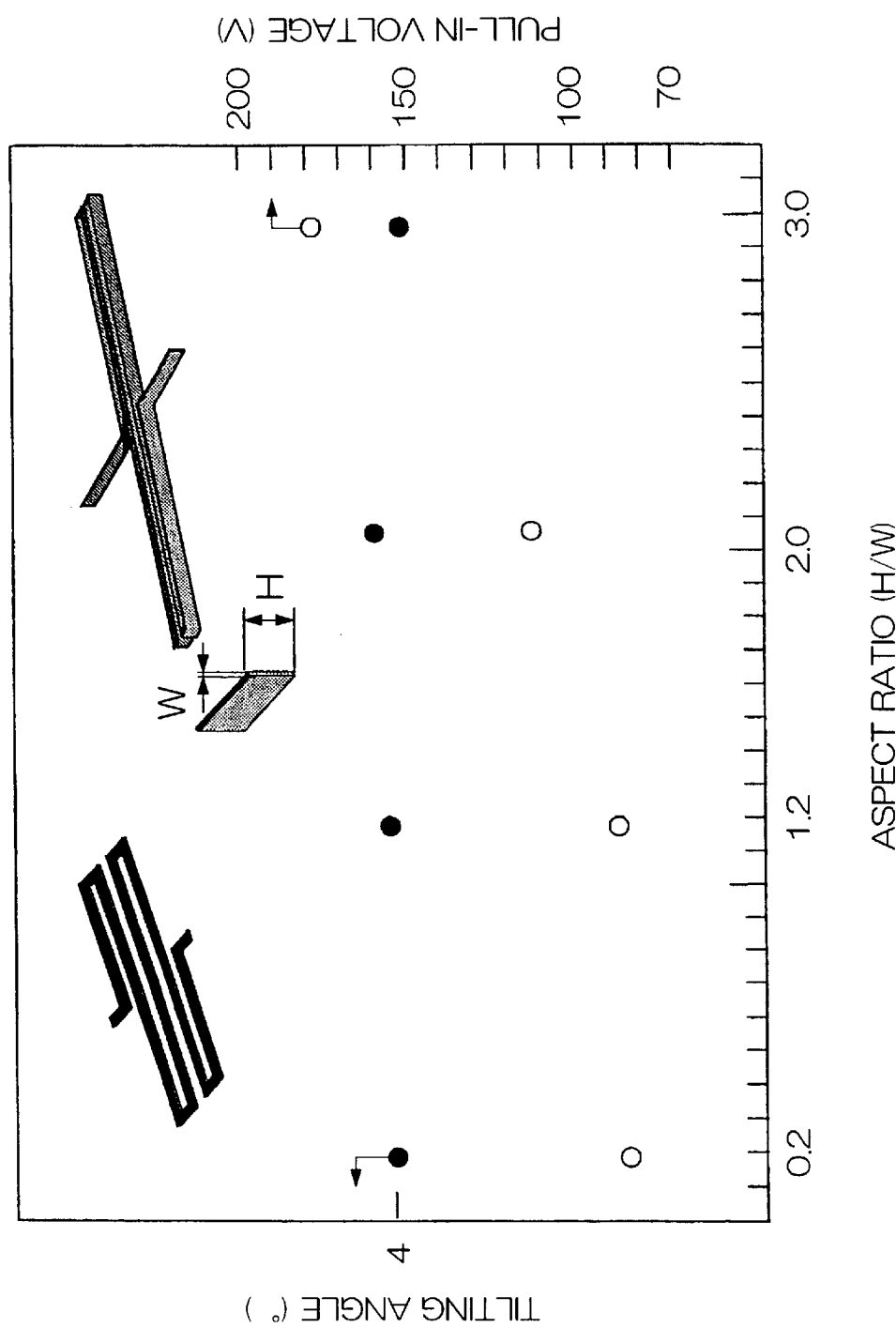
FIG. 29 is a graph showing results of the present invention.

The result is shown in FIG. 29. As shown in FIG. 29, although the sensibility of each examples are similar, the pull-in voltage could be improved by increasing the aspect ratio of the torsion springs.

Experiment 2

Figure 31:
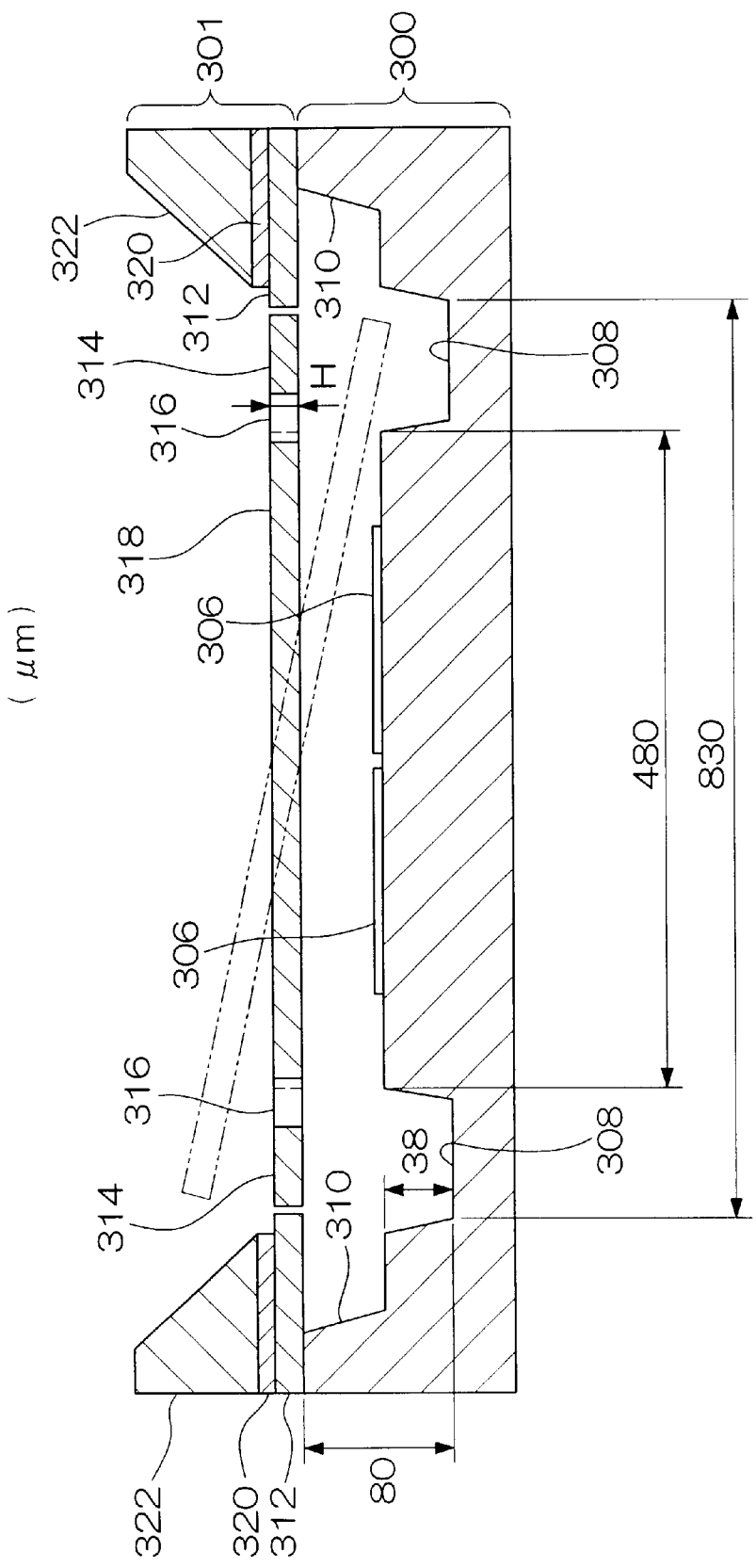
FIG. 31 is a cross-section of Comparative Example.

Next, a comparative example shown in FIG. 31 was manufactured so as to have an aspect ratio (H/W) of 3.0. This comparative example did not comprise the convex portion 302, and the other structures are the same as those of the example of FIG. 30 having an aspect ratio of 3.0.

Furthermore, a fifth example, which has the same structure as that shown in FIG. 33 and the same sizes shown in FIG. 30, was manufactured.

Figure 32:
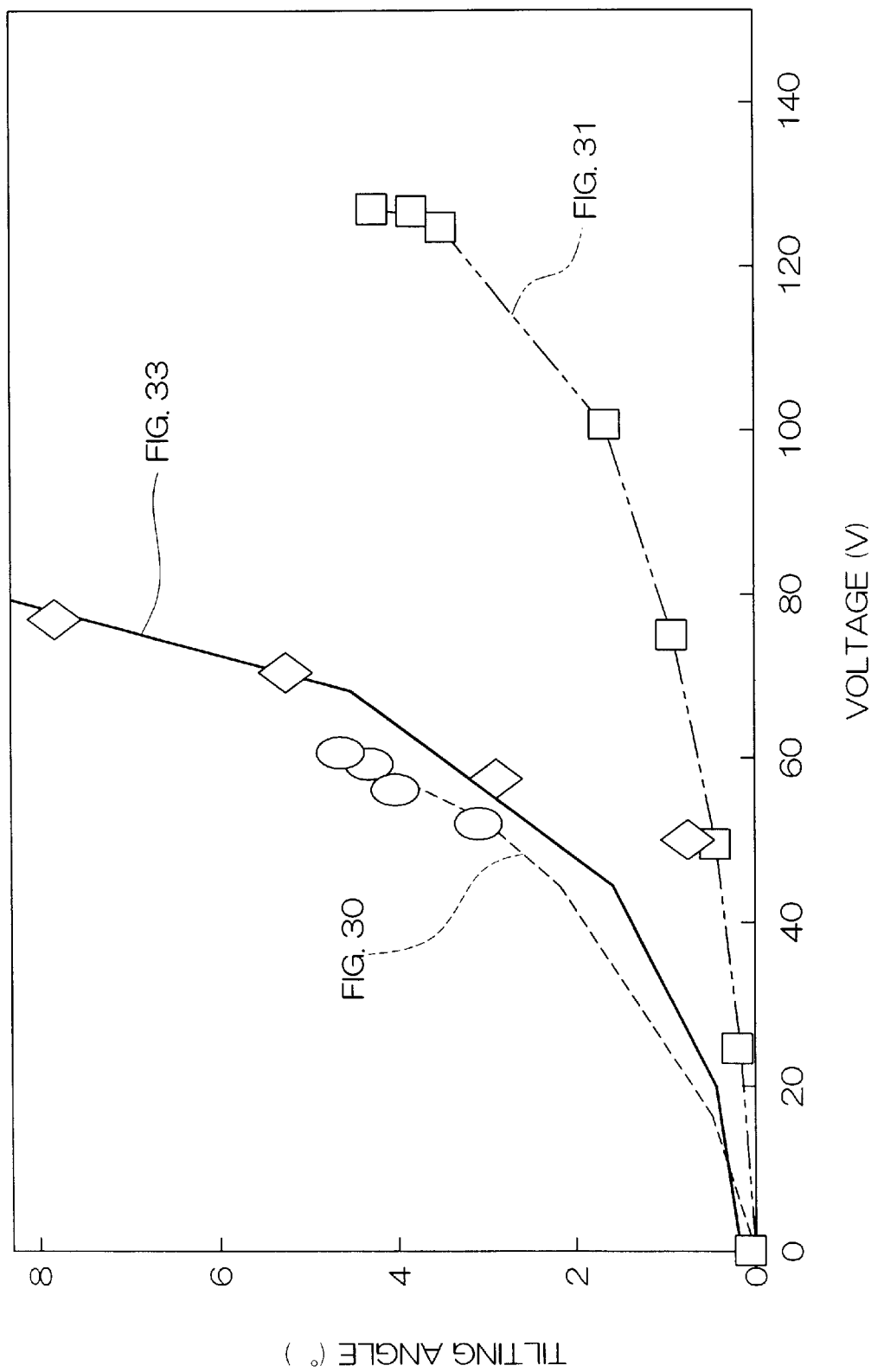
FIG. 32 is a graph showing the results in the apparatuses of FIGS. 30 and 31.

By applying various voltages to these three micro-mirror apparatuses, tilting angles of the mirrors were measured. The results are shown in FIG. 32. It is clear from this graph that the tilting angle could be increased by providing the convex portion 302 as shown in FIGS. 30 and 33. The example of FIG. 30 tilted the mirror at voltages lower than those of the examples of FIGS. 31 and 33. However, the applicants found that the example of FIG. 33 was easy to control at the tilting angle over 4 degrees as shown in FIG. 32.

What is claimed is:

1. A micro-mirror apparatus comprising:
   a mirror;
   a plurality of torsion springs which supports the mirror so as to be tiltable relative to an upper substrate;
   a lower substrate arranged facing a lower face of the mirror;
   a convex portion provided on an upper face of the lower substrate and facing a central portion of the mirror; and
   a plurality of lower electrodes formed on an outer face of the convex portion.

2. A micro-mirror apparatus according to claim 1, wherein for the torsion spring, an aspect ratio of height/width in a cross-section perpendicular to a longitudinal direction thereof is at least 1.8.

3. A micro-mirror apparatus according to claim 1, wherein a concavity is formed in an upper face of the lower substrate at a position facing an outer peripheral edge of the mirror and surrounding the convex portion.

4. A micro-mirror apparatus according to claim 1, wherein a supporting point protuberance made from an insulating material is formed facing a center of the mirror.

5. A micro-mirror apparatus according to claim 1, wherein the torsion spring has a serpentine form, and a position restricting portion which restricts a displacement range of the torsion spring is provided on the upper substrate.

6. A micro-mirror apparatus according to claim 1, wherein the mirror, the torsion spring, and the upper substrate are integrally formed from silicon monocrystal, and this silicon monocrystal is connected to a spacer formed on the lower substrate.

7. A micro-mirror apparatus according to claim 1, wherein wiring patterns are formed on a lower face of the lower substrate, and each of the wiring patterns and the lower electrodes are conducted through a through hole formed in the lower substrate.

8. A micro-mirror apparatus according to claim 1, wherein the upper substrate is either one of an SOI substrate and a SIMOX substrate.

9. A micro-mirror apparatus according to claim 1, wherein an insulating film is formed on at least an opening edge portion of the concavity.

* * * * *